(12) United States Patent  
Zink et al.

(10) Patent No.: US 12,363,360 B2
(45) Date of Patent: Jul. 15, 2025

(54) CONTENT PRODUCTION AND PLAYOUT FOR SURROUND SCREENS

(71) Applicant: WARNER BROS. ENTERTAINMENT INC., Burbank, CA (US)

(72) Inventors: Michael Zink, Escondido, CA (US); Prashant Abhyankar, Burbank, CA (US); Ha Nguyen, Fullerton, CA (US); Pamela J. Allison, Burbank, CA (US); Michael Smith, Santa Monica, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 102 days.

(21) Appl. No.: 17/417,109

(22) PCT Filed: Dec. 19, 2019

(86) PCT No.: PCT/US2019/067406
§ 371 (c)(1),
(2) Date: Feb. 8, 2022

(87) PCT Pub. No.: WO2020/132200
PCT Pub. Date: Jun. 25, 2020

(65) Prior Publication Data
US 2024/0196026 A1   Jun. 13, 2024

Related U.S. Application Data

(60) Provisional application No. 62/784,312, filed on Dec. 21, 2018.

(51) Int. Cl.
H04N 21/234   (2011.01)
H04N 21/233   (2011.01)
(Continued)

(52) U.S. Cl.
CPC . H04N 21/234345 (2013.01); H04N 21/2335 (2013.01); H04N 21/4122 (2013.01); H04N 21/44218 (2013.01)

(58) Field of Classification Search
CPC ....... H04N 21/234345; H04N 21/2335; H04N 21/4122; H04N 21/44218
(Continued)

(56) References Cited

U.S. PATENT DOCUMENTS 11,195,555 B2 * 12/2021 Vaquero ............... G06F 18/295
2013/0181901 A1   7/2013 West
(Continued)

FOREIGN PATENT DOCUMENTS

KR   10-2003-0073018 A   9/2003

OTHER PUBLICATIONS

WO, PCT/US2019/067406 ISR and Written Opinion, Apr. 20, 2020.
European Patent Office, EP Application No. 19899123.4, Feb. 2, 2024, 12 pages.

Primary Examiner — Dominic D Saltarelli
(74) Attorney, Agent, or Firm — Bookoff McAndrews, PLLC

(57) ABSTRACT

Methods and apparatus for generating and configuring video content for surround screens include repurposing archive content and producing new content. Applications for the method include surround projection systems in cinemas, autonomous vehicles, home theaters, clubs, shops or other spaces for displaying content; and surround content for use with virtual reality headgear.

20 Claims, 22 Drawing Sheets

(51) Int. Cl.
*H04N 21/2343* (2011.01)
*H04N 21/41* (2011.01)
*H04N 21/442* (2011.01)

(58) Field of Classification Search
USPC .................................................. 375/240.26
See application file for complete search history.

(56) References Cited

U.S. PATENT DOCUMENTS

| | | | |
|---|---|---|---|
| 2013/0235085 A1* | 9/2013 | Kim | G06F 3/1454 |
| | | | 345/660 |
| 2015/0237333 A1 | 8/2015 | Smoot et al. | |
| 2016/0080710 A1 | 3/2016 | Hattingh et al. | |
| 2016/0119507 A1 | 4/2016 | Duyvejonck et al. | |
| 2018/0059528 A1 | 3/2018 | Gocke | |
| 2018/0089900 A1 | 3/2018 | Rober et al. | |
| 2018/0284885 A1 | 10/2018 | Kim | |
| 2018/0293960 A1* | 10/2018 | Chen | G09G 5/14 |
| 2020/0288164 A1* | 9/2020 | Lin | H04N 19/00 |
| 2021/0250639 A1* | 8/2021 | Gupta | H04N 21/4524 |

* cited by examiner

1102
ACCESSING, BY ONE OR MORE PROCESSORS, AN INDICATION OF A SCHEME FOR ALLOCATING THE DIGITAL CONTENT BETWEEN DIFFERENT PORTIONS OF A SURROUND SCREEN SYSTEM

1104
ALLOCATING, BY THE ONE OR MORE PROCESSORS, THE DIGITAL CONTENT TO THE DIFFERENT PORTIONS ACCORDING TO THE SCHEME

1106
PROVIDING, BY THE ONE OR MORE PROCESSORS, DIFFERENT PARTS OF THE DIGITAL CONTENT TO DIFFERENT OUTPUT DEVICES FOR OUTPUT IN SYNCHRONY TO THE SURROUND SCREEN SYSTEM

1122
WHEREIN THE ALLOCATING FURTHER COMPRISES GENERATING SEPARATE CONTEMPORANEOUS VIDEO SIGNAL OUTPUTS, ONE FOR EACH OF THE OUTPUT DEVICES

1124
WHEREIN THE ALLOCATING FURTHER COMPRISES GENERATING A SINGLE VIDEO SIGNAL OUTPUT WITH METADATA ENABLING A DOWNSTREAM RECEIVING DEVICE TO SEND THE DIFFERENT PARTS OF THE DIGITAL CONTENT TO THE DIFFERENT OUTPUT DEVICES

1126
WHEREIN THE DOWNSTREAM RECEIVING DEVICE DIVIDES THE VIDEO SIGNAL OUTPUT INTO THE DIFFERENT PARTS FOR EACH OF THE OUTPUT DEVICES

1128
RECEIVING THE DIGITAL CONTENT SELECTED FROM THE GROUP CONSISTING OF: STREAMING DIGITAL CONTENT, A DIGITAL FILE, OR A COLLECTION OF DIGITAL FILES

1130
RECEIVING THE DIGITAL CONTENT SEGREGATED FOR THE DIFFERENT PORTIONS OF THE SURROUND SCREEN SYSTEM, WHEREIN THE ALLOCATING IS BASED AT LEAST IN PART ON HOW THE DIGITAL CONTENT IS SEGREGATED WHEN RECEIVED

1162 — WHEREIN THE DIGITAL CONTENT COMPRISES A SEQUENCE OF PANELS, AND THE SCHEME CALLS FOR MOVING THE PANELS IN SEQUENCE ALONG THE DIFFERENT PORTIONS BASED ON ORDER ALONG A LINE

1164 — WHEREIN THE DIGITAL CONTENT COMPRISES WIDESCREEN IMAGES, AND THE SCHEME CALLS FOR SPREADING THE WIDESCREEN IMAGES AMONG ADJACENT PANELS OF THE SURROUND SCREEN SYSTEM

1166 — GENERATING AT LEAST A PORTION OF DIGITAL CONTENT BY RENDERING CONTENT USING A MODEL [2D OR 3D] AND RENDERING ENGINE

1168 — DETERMINING RENDERING PARAMETERS BASED ON ONE OR MORE OF: BIOMETRIC DATA FROM ONE OR MORE AUDIENCE MEMBERS INDICATING A NEUROLOGICAL RESPONSE; TRIP INFORMATION RELATING TO MOTION OF THE SURROUND SCREEN SYSTEM, AND A PROFILE OF VIDEO CONTENT ON A HIGHEST-PRIORITY PORTION OF THE DIGITAL CONTENT

1170 — GENERATING THE SCHEME FOR ALLOCATING THE DIGITAL CONTENT BASED ON A LEAST ONE OF A RULES-BASED ALGORITHM AND A MACHINE-LEARNING ALGORITHM (CL. 17)

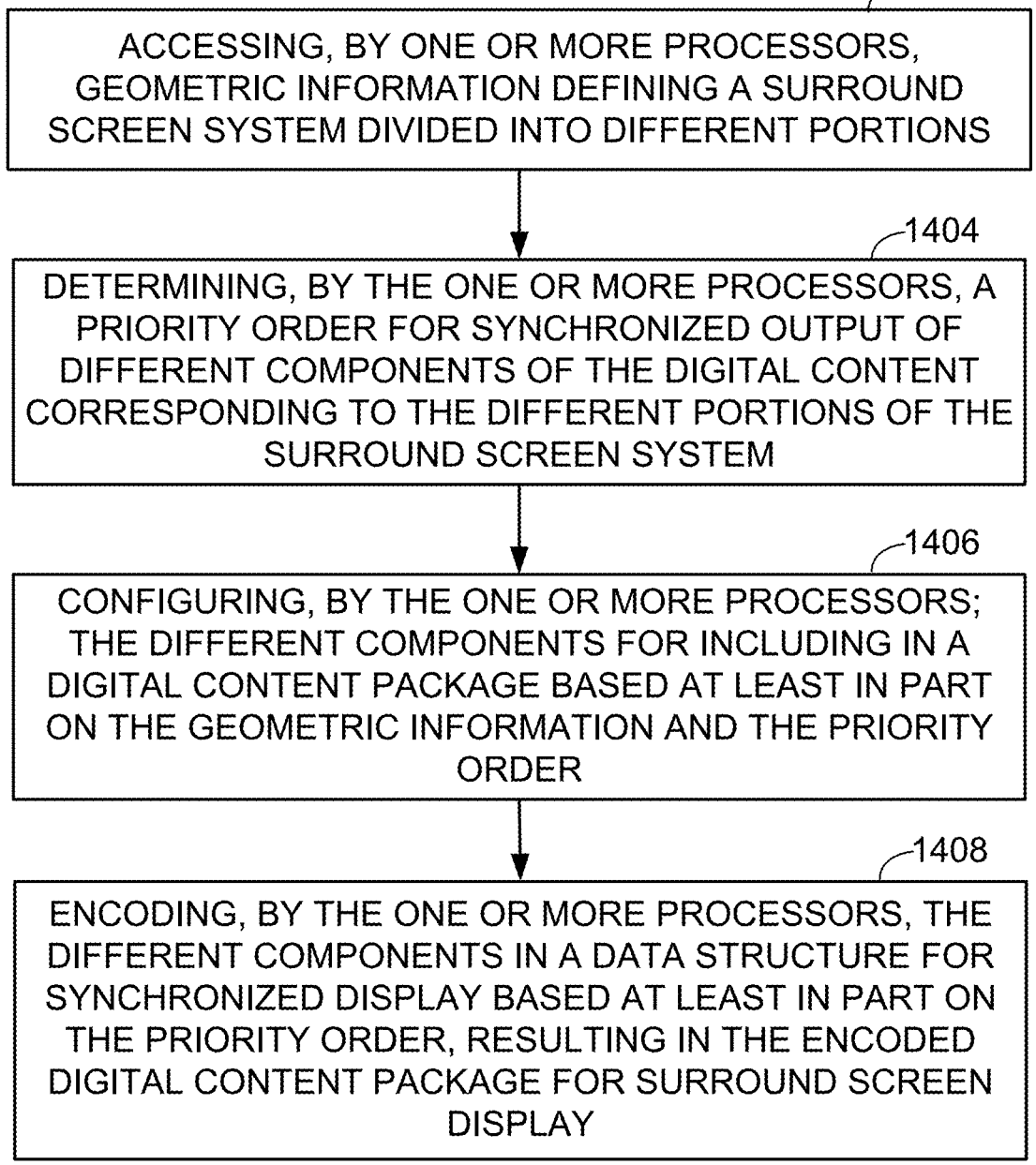

1432 — WHEREIN THE DIFFERENT COMPONENTS COMPRISE AT LEAST ONE OF VIDEO CLIPS OR PANELIZED STATIC IMAGES ARRANGED IN A NARRATIVE ORDER

1434 — WHEREIN DETERMINING THE PRIORITY ORDER FURTHER COMPRISES BASING THE PRIORITY ORDER AT LEAST IN PART ON AN INDICATOR OF WHICH OF THE DIFFERENT PORTIONS AN AUDIENCE MEMBER IS LOOKING AT

1436 — INCLUDING IN THE DIGITAL CONTENT DIFFERENT AUDIO TRACKS CORRESPONDING TO THE DIFFERENT PORTIONS

1438 — INCLUDING RULES IN THE DIGITAL CONTENT FOR ALTERING THE PRIORITY BASED AT LEAST IN PART ON WHICH OF THE DIFFERENT PORTIONS IS CLOSEST TO THE CENTER OF GAZE OF AN AUDIENCE MEMBER AND A DURATION OF THE GAZE. [FLOAT BACK TO MAIN SCREEN]

1440 — WHEREIN THE DIGITAL CONTENT COMPRISES COMPONENTS EACH ASSIGNED TO A NODE OF A NARRATIVE TREE AND THE METHOD FURTHER COMPRISES INCLUDING RULES IN THE DIGITAL CONTENT FOR SELECTING COMPONENTS BASED AT LEAST IN PART ON: A POSITION OF ITS ASSIGNED NODE IN THE NARRATIVE TREE, WHICH OF THE DIFFERENT PORTIONS IS CLOSEST TO THE CENTER OF GAZE OF AN AUDIENCE MEMBER, AND A DURATION OF THE GAZE

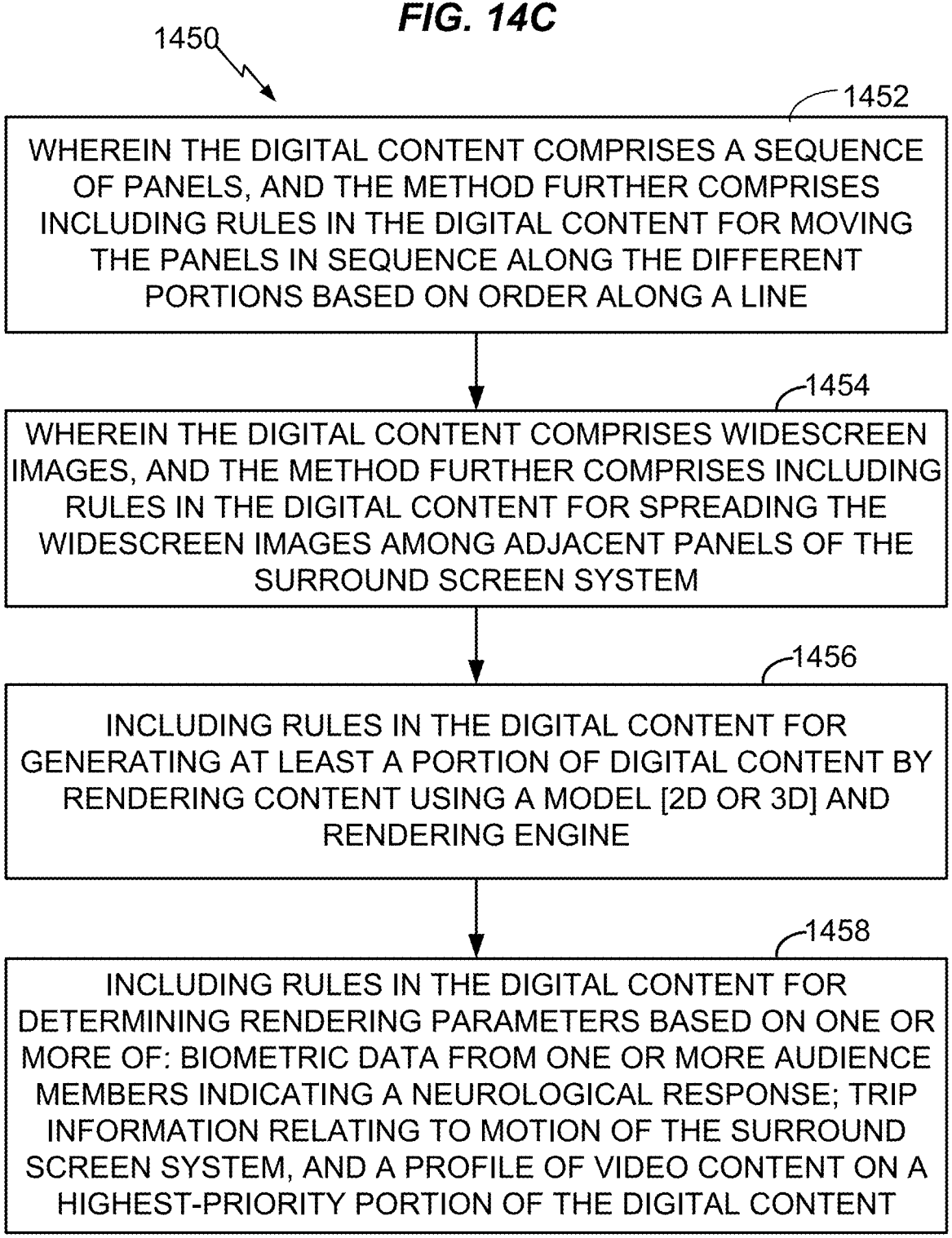

CONTENT PRODUCTION AND PLAYOUT FOR SURROUND SCREENS

CROSS-REFERENCE TO RELATED APPLICATION

The present application is a U.S. National Stage under 35 USC 371 of International Application No. PCT/US19/67406, filed Dec. 19, 2019, which claims priority to U.S. Provisional Application Ser. No. 62/784,312 filed Dec. 21, 2018, the disclosures of both of which are incorporated herein in their entireties by reference.

FIELD

The present disclosure relates to methods and systems for content production, configuration and playing for surround screens, particularly autonomous vehicle screens with a front screen and two or more opposing side screens, optionally a rear screen and other screens.

BACKGROUND

Directors seeking to impress audiences have used simultaneous projection onto multiple screens for decades. As display screens and computer processing have become cheaper and more abundant, so have multi-screen displays. Some multi-screen displays seek to surround the audience, using a surround screen. Video content is produced for immersive applications using 360° cameras that capture images surrounding the camera, or by rendering a scene using a virtual 360° camera.

However, much content is not easily captured or rendered using a 360° camera. For example, legacy video content or any video shot primarily for non-surround screens only captures a viewpoint in the camera direction with a limited field of view. This content will only fill a small portion of a surround screen. It would be desirable to display legacy content on surround screens in a more engaging manner for wider audience exposure.

Furthermore, while immersive viewing experiences can be entertaining, alternatives for using surround screens may enable more varied audience experiences using different methods for filling screen space, providing a greater diversity of engaging audience experiences.

It would be desirable, therefore, to develop new methods and systems for production, configuration, and playing of media content that is customized for an audience experience in real-time for a surround screen, that overcome these and other limitations of the prior art and deliver more compelling entertainment experiences for the audience of tomorrow.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a computer-implemented method is disclosed for processing or providing digital content by one or more processors of a client device such as a media player and/or a server for a surround screen system or surround screen output. As used herein, a "surround screen" is a display screen or a set of screens extending beyond peripheral vision, for example, a screen that surrounds between at least about 110° and 360° of the audience in at least one plane, for example, from 180° to 360°. The surround screen may be a structure or a set of structures (that may include one or more screens) that presents an integrated or separated cylindrical or spherical surface(s) for one or more projectors or for light emission, for example using a liquid crystal display (LCD) illuminated by light-emitting diodes (LEDs). The display surface may be contoured along an ellipse in two or three dimensions or approximated by an assembly of flat panels. In immersive virtual reality, a view of virtual surroundings is built into the operation of the virtual reality gear. So long as the virtual reality player is provided with content to fill surrounding views, the viewer can receive 360° views in every direction.

The digital content may be allocated to different portions of the surround screen system based on one or more schemes. As used herein, a scheme is a set of instructions for allocating different parts of the digital content between different portions of a surround screen system. For example, a scheme may define how a media player(s) provides different parts of the digital content to different output devices for output in synchrony with each other to the surround screen system. In case the digital content is segregated for different portions of the surround screen system, the scheme defines the allocation of the digital content to the portions based at least in part on how the digital content is segregated when received by one or more processors. In some implementations, different components of the digital content may be encoded in a data structure for synchronized display based at least in part on the priority order for synchronized output of the different components, geometric information defining the surround screen system, or both.

The scheme for allocating the digital content or encoding of (the different components of) the digital content, may be modified or adjusted based on parameters indicating or aimed at affecting an audience experience of one or more audience members consuming the digital content. As used herein, an audience experience is a phenomenon or occurrence experienced or enacted by an audience while consuming the digital content. Audience experience may include, for example, occurrence of an action or a dialog as part of a digital content played on a surround screen; a bodily act or gesture, such as a gaze or voice, of an audience member while consuming the digital content; a neurological response indicated by biometric data of one or more audience members; motion of the surround screen, and profile of the digital content. Using one or more processors of a client device such as a media player and/or a server, the method processes digital content for a surround screen input that is customized for an audience experience in real-time using a surround screen system.

In an aspect, the media player is equipped in a connected vehicle. As used herein, connected vehicle is a vehicle equipped with network access, usually via a wireless network, such as wireless mesh network, allowing the vehicles to share network access, for example Internet access, with other devices both inside as well as outside the vehicles. Often, the vehicles are equipped with technologies and applications that tap into the wireless network, including the Internet, to provide benefits to the travelers, including the drivers and the passengers. The connected vehicle may be coupled to a mobile mesh network. As the connected vehicle travels along a route, it may connect to and exchange data with servers of a mobile mesh network or other network based at least on proximity to the vehicle, quality of wireless connectivity between each prospective mobile mesh network server and a receiver, for example a media player within the connected vehicle, or servers at places of interest. As used in the present disclosure, connected vehicles may be referred to simply as vehicles and may include various suitable types of vehicles, whether driven autonomously or driven by a person. Connection and disconnection of nodes of the mobile mesh network may themselves be audience experiences.

The method for processing digital content by one or more processors of a media player for a surround screen output may include: accessing, by the one or more processors, an indication of a scheme for allocating the digital content between different portions of a surround screen system; allocating, by the one or more processors, the digital content to the different portions according to the scheme; and providing, by the one or more processors, different parts of the digital content to different output devices for output in synchrony to the surround screen system. In an aspect of the method, the allocating may further include generating separate contemporaneous video signal outputs, one for each of the output devices. In another aspect of the method, the allocating may further include generating a single video signal output with metadata enabling a downstream receiving device to send the different parts of the digital content to the different output devices. For example, in the method, the downstream receiving device divides the video signal output into the different parts for each of the output devices.

The method may further include receiving the digital content selected from the group consisting of: streaming digital content, a digital file, or a collection of digital files. The method may further include receiving the digital content segregated for the different portions of the surround screen system, wherein the allocating is based at least in part on how the digital content is segregated when received. The method may further include receiving the digital content segregated according to priority, wherein the allocating in based at least in part on the priority. The method may further include detecting which of the different portions an audience member is looking at. For example, in an aspect of the method, each of the different portions has a corresponding one of different audio tracks, and further comprising serving a selected one of the different audio tracks corresponding to which of the different portions an audience member is looking at.

The method may further include altering the priority based at least in part on which of the different portions is closest to the center of gaze of an audience member and a duration of the gaze. In some embodiments, altering the priority as described will cause items of greatest interest to the viewer to move to a main or center screen area. In an aspect of the method, the digital content may include components each assigned to a node of a narrative tree and the method further comprises selecting components based at least in part on: a position of its assigned node in the narrative tree, which of the different portions is closest to the center of gaze of an audience member, and a duration of the gaze.

In another aspect of the method, the digital content includes a sequence of panels, and the scheme calls for moving the panels in sequence along the different portions based on order along a line.

In another aspect of the method, the digital content includes widescreen images, and the scheme calls for spreading the widescreen images among adjacent panels of the surround screen system.

The method may further include, by the one or more processors, generating at least a portion of digital content by rendering content using a model (2D or 3D) and rendering engine.

The method may further include, by the one or more processors, determining rendering parameters based on one or more of: biometric data from one or more audience members indicating a neurological response; trip information relating to motion of the surround screen system, and a profile of video content on a highest-priority portion of the digital content.

The method may further include generating the scheme for allocating the digital content based on a least one of a rules-based algorithm and a machine-learning algorithm.

The method may further include modifying the scheme based on an audience experience.

In an aspect of the disclosure, an apparatus for processing digital content for a surround screen output includes at least one processor coupled to a memory, the memory holding program instructions that when executed by the at least one processor cause the apparatus to perform: accessing an indication of a scheme for allocating the digital content between different portions of a surround screen system; allocating the digital content to the different portions according to the scheme; and providing different parts of the digital content to different output devices for output in synchrony to the surround screen system.

In an aspect of the apparatus, the memory holds further instructions for performing any one or more of the operations of the method of the present disclosure.

In another aspect of the disclosure, an apparatus for processing digital content for a surround screen output includes: means for accessing an indication of a scheme for allocating the digital content between different portions of a surround screen system; means for allocating the digital content to the different portions according to the scheme; and means for providing different parts of the digital content to different output devices for output in synchrony to the surround screen system.

In another aspect of the disclosure, a method for providing digital content for a surround screen system by one or more processors of a server includes: accessing, by one or more processors, geometric information defining a surround screen system divided into different portions; determining, by the one or more processors, a priority order for synchronized output of different components of the digital content corresponding to the different portions of the surround screen system; configuring, by the one or more processors, the different components for including in a digital content package based at least in part on the geometric information and the priority order; and encoding, by the one or more processors, the different components in a data structure for synchronized display based at least in part on the priority order, resulting in the encoded digital content package for surround screen display.

In an aspect of the method, the different components include at least one of video clips or panelized static images arranged in a narrative order.

In an aspect of the method, the determining the priority order further includes basing the priority order at least in part on an indicator of which of the different portions an audience member is looking at.

The method may further include including in the digital content different audio tracks corresponding to the different portions.

The method may further include including rules in the digital content for altering the priority based at least in part on which of the different portions is closest to the center of gaze of an audience member and a duration of the gaze.

In an aspect of the method, the digital content includes components each assigned to a node of a narrative tree and the method further comprises including rules in the digital content for selecting components based at least in part on: a position of its assigned node in the narrative tree, which of the different portions is closest to the center of gaze of an audience member, and a duration of the gaze.

In an aspect of the method, the digital content includes a sequence of panels, and the method further comprises including rules in the digital content for moving the panels in sequence along the different portions based on order along a line.

In an aspect of the method, the digital content includes widescreen images, and the method further comprises including rules in the digital content for spreading the widescreen images among adjacent panels of the surround screen system.

The method may further include including rules in the digital content for generating at least a portion of digital content by rendering content using a model (2D or 3D) and rendering engine.

The method may further include including rules in the digital content for determining rendering parameters based on one or more of: biometric data from one or more audience members indicating a neurological response; trip information relating to motion of the surround screen system, and a profile of video content on a highest-priority portion of the digital content.

In another aspect of the present disclosure, an apparatus for providing digital content for a surround screen system includes at least one processor coupled to a memory, the memory holding program instructions that when executed by the at least one processor cause the apparatus to perform: accessing geometric information defining a surround screen system divided into different portions; determining a priority order for synchronized output of different components of the digital content corresponding to the different portions of the surround screen system; configuring the different components for including in a digital content package based at least in part on the geometric information and the priority order; and encoding the different components in a data structure for synchronized display based at least in part on the priority order, resulting in the encoded digital content package for surround screen display.

In an aspect of the apparatus, the memory holds further instructions for performing any one or more of the operations defined by the method of the present disclosure.

In another aspect of the present disclosure, an apparatus for processing digital content for a surround screen output includes: means for accessing geometric information defining a surround screen system divided into different portions; means for determining a priority order for synchronized output of different components of the digital content corresponding to the different portions of the surround screen system; means for configuring the different components for including in a digital content package based at least in part on the geometric information and the priority order; and means for encoding the different components in a data structure for synchronized display based at least in part on the priority order, resulting in the encoded digital content package for surround screen display.

The foregoing method may be implemented in any suitable programmable computing apparatus, by provided program instructions in a non-transitory computer-readable medium that, when executed by a computer processor, cause the apparatus to perform the described operations. The processor may be local to the apparatus and user, located remotely, or may include a combination of local and remote processors. An apparatus may include a computer or set of connected computers that is used in audio video production or for output of audio video content to one or more users. An audio video output device may include, for example, a personal computer, mobile phone, notepad computer, mixed reality device, virtual reality device, augmented reality device, or special-purpose hardware for vehicles. Special-purpose hardware for vehicles may include, for example, window glass equipped with one or more LCD layers for augmented reality or conventional display, projectors with projection screens incorporated into the vehicle interior; seats equipped with motion-simulating and/or motion-damping systems; vehicle audio systems; and active vehicle suspensions. Other elements of the apparatus may include, for example, an audio output device and a user input device, which participate in the execution of the method. An apparatus may include a virtual, augmented, or mixed reality device, such as a headset or other display that reacts to movements of a user's head and other body parts. The apparatus may include biometric sensors that provide data used by the method.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 4C is a graphic rendering of an example surround screen including a main screen, and a sub-screen.

FIG. 14A is a flow chart illustrating a process for providing, by one or more processors, digital content for a surround screen system.

FIGS. 14B-14C are flow charts illustrating further optional aspects or operations of the method diagrammed in FIG. 14A.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects.

Figure 1:
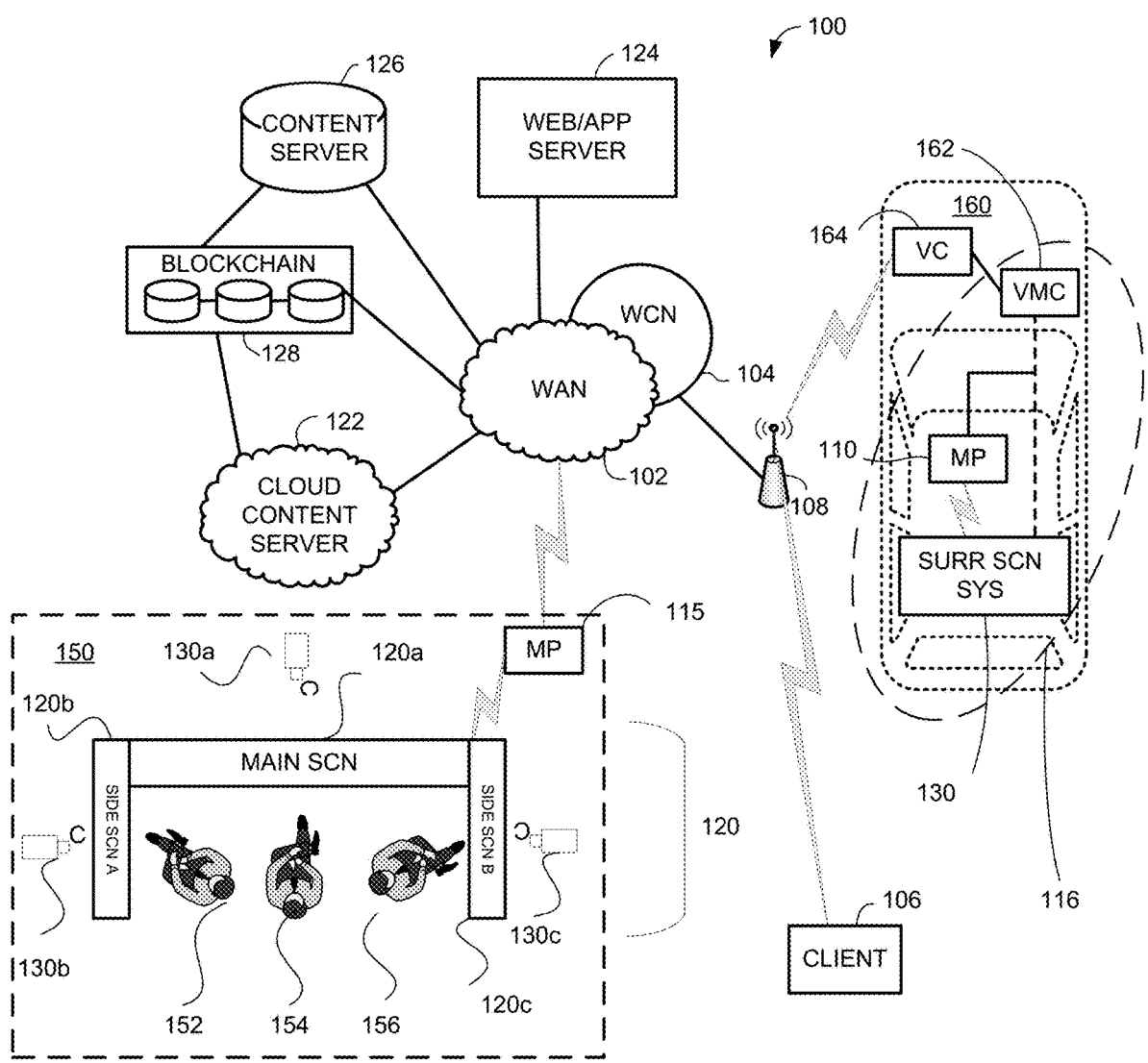
FIG. 1 is a schematic block diagram illustrating aspects of a system and apparatus for processing or providing digital content by one or more processors of a client device such as a media player and/or a server for a surround screen system or surround screen output.

Referring to FIG. 1, methods for processing or providing digital content by one or more processors of a client device such as a media player and/or a server for a surround screen system or surround screen output may be implemented in a network 100. Other architectures may also be suitable. In a network architecture, sensor data can be collected and processed locally, and used to control streaming data from a network source. In alternative aspects, audio-video content may be controlled locally, and log data provided to a remote server. As used herein, "digital content" includes digital audio, video, audio-video, graphic, text, and mixed reality content that is arranged at least in part by a script or plan designed to entertain or inform. The digital content may also be configured to support interactive features resembling video game features or may be devoid of interactive features except for responding to data indicative of user's location, preferences, biometric states or affinities.

The methods may include using a scheme for allocating the digital content between different portions of a surround screen system. Information used may include geometric information defining a surround screen system divided into different portions, or a priority order for synchronized output of different components of the digital content. Other information used may also include audience (e.g., passenger of the vehicle) experience to select or configure digital content components to satisfy at least one of the passenger's interests, preferences, or safety needs. Other information used may include travel context data regarding the passenger relevant to a purpose of a trip, for example time, place, booking information, stated reason, such that the digital content components are directed to furthering the purpose of the trip, for example, by preparing the passengers for the destination or revisiting an experience at the origin or places along the route. The method may determine a purpose of a trip based on the origin, points along the route, or the destination. In an aspect, the purpose of the trip may be determined or received from a ride-hailing or tour-booking application. When there are multiple passengers in a vehicle, the methods may include allocating different components of the digital content on different portions of the surround screen system for different passengers based on each passenger's user preference information or biometric data.

In an aspect, the methods may include producing media content having mixed reality (xR) content. Mixed reality encompasses virtual reality and augmented reality. In an example, the methods may include selecting or configuring the digital content components based on one or more places along the route between the origin and the destination, such that the digital content augments or replaces real scenery with related altered or fantasy scenery. The media components may include 3D data or models suitable for rendering elements. In an alternative aspect, or in addition, the digital content components may include pre-rendered data.

As will be shown further herein below, the content server may share travel information with servers at places (or points) of interest along the route. Having the travel information, in an aspect, when the media player in a vehicle receives signal from a server at a place of interest along the route and in proximity to the vehicle, the signal may indicate the location and other information of the place of interest. The information may include an offer to interact with a person or machine at the place of interest, based on, for example the passenger's profile, preference, log-level user data, biometric data, or trip data. In an aspect, an offer is sent to the vehicle may be based on a predictive algorithm determining that a likelihood of the passenger accepting the offer exceeds a threshold.

In an aspect, the methods may further include using predictive algorithms in selecting or configuring digital content components. A predictive algorithm process may predict an affinity of a user of the player device based at least in part on biometric data from one or more audience members indicating a neurological response, trip information relating to motion of the surround screen system, and a profile of video content on a highest-priority portion of the digital content. The neurological response may then become part of the profile and trip information.

In an aspect, the travel route may dynamically change in real-time, for example based on events along the route. In an aspect, sensors at the vehicle may detect and report the changes to one or more servers. Based on the changes, the servers may select or configure new digital content components, produce new digital content package for output at the vehicle. In another aspect, the servers may receive changes to the route from the sources of the travel information, for example, a tour app. Places of interest may also change, get removed from or added to the route in real-time based on, for example, real-time conditions or passengers' preferences. Conditions may include conditions of the places of interest or of the route, etc. In another aspect, places of interest may be moving objects along the route, for example, a vehicle with specific identification or special characteristics (for example a bus with a specific billboard). As with changes in the route, changes in the places of interest may cause the servers to select or configure new media components and produce new media content. In another aspect, the method may further include simulating at least one of the vehicle driver or a fellow passenger. The simulation may provide gaming capabilities, or social networking.

A suitable network environment 100 for practice of the methods summarized above may include various computer servers and other network entities in communication with one another and with one or more networks, for example a Wide Area Network (WAN) 102 (e.g., the Internet) and/or a wireless communication network (WCN) 104, for example a cellular telephone network using any suitable high-bandwidth wireless technology or protocol, including, for example, cellular telephone technologies such as 3rd Generation Partnership Project (3GPP) Long Term Evolution (LTE), 5G fifth-generation cellular wireless, Global System for Mobile communications (GSM) or Universal Mobile Telecommunications System (UMTS), and/or a wireless local area network (WLAN) technology using a protocol such as Institute of Electrical and Electronics Engineers (IEEE) 802.11, and equivalents thereof. The servers and other network entities (collectively referred to as "nodes") connect directly, dynamically and non-hierarchically to as many other nodes as possible and cooperate with one another to efficiently route data from/to client devices. This lack of dependency on one node allows for every node to participate in the relay of information. Mesh networks dynamically self-organize and self-configure. The servers can connect to client devices in a server-client structure. Some client devices can also act as servers.

Client devices may include, for example, portal personal devices (PPDs) such as smartphones, smartwatches, notepad computers, laptop computers, and mixed reality headsets, and special purpose media players and servers, herein called vehicle media controllers (VMCs) installed as part of vehicular electronic systems. In an implementation, VMC 162 in vehicle 160 may be coupled to vehicle controller (VC) 164 as a component of a vehicular control system. The VC may control various other functions with various components, for example, engine control, interior climate control, anti-lock braking, navigation, or other functions, and may help coordinate media output of the VMC to other vehicular functions, especially navigation.

Computer servers may be implemented in various architectures. For example, the environment 100 may include one or more Web/application servers 124 containing documents and application code compatible with World Wide Web protocols, including but not limited to HTML, XML, PHP and JavaScript documents or executable scripts, for example. The environment 100 may include one or more content servers 126 for holding data, for example video, audio-video, audio, text, and graphical content components of digital content for consumption using a client device, software for execution on or in conjunction with client devices, and data collected from users or client devices. Data collected from client devices or users may include, for example, sensor data and application data. Sensor data may be collected by a background (not user-facing) application operating on the client device, and transmitted to a data sink, for example, a cloud-based content server 122 or discrete content server 126. Application data means application state data, including but not limited to records of user interactions with an application or other application inputs, outputs or internal states. Applications may include software for selection, delivery or control of media content and supporting functions. Applications and data may be served from other types of servers, for example, any server accessing a distributed blockchain data structure 128, or a peer-to-peer (P2P) server 116 such as may be provided by a set of client devices 110, 130, and 162 operating contemporaneously as micro-servers or clients.

In an aspect, information held by one or more of the content server 126, cloud-based content server 122, distributed blockchain data structure 128, or a peer-to-peer (P2P) server 116 may include a data structure of media production data in an ordered arrangement of digital content components for surround screen systems. The data structure may relate components of digital content configuration data to scheme data such as segregation priority and other data, and other unique metadata sets characterizing each of the components. As used herein, a "digital content component," "component," or "part" of a digital content is a discrete package or collection of data that encodes a component of digital content. Digital components may include, for example, "media segments," which are sets of audio, video, audio-video, or other encodings of sensory output by a media player having a beginning, end, and duration. An audio clip, a video clip, or an audio-video clip are examples of a media segment. Media segments may comprise parallel tracks of encoded data, each of which is itself a media segment. For example, an audio-video segment includes a video segment in parallel to an audio segment. If the media player supports other sensory output modalities, other types of media segments may include, for example, a motion simulation segment for driving a motion simulator, an olfactory segment for driving an odor generator, a tactile segment for driving a tactile output device, and so forth. Other media components are not segments but nonetheless are data that encodes sensible output. For example, three-dimensional (3D) model data and related texture data are not media segments but once rendered by a game engine will appear in output digital content and are necessary to render the content.

As used herein, users (who can also be passengers) are audience members or consumers of digital content. When actively participating in content via an avatar or other agency, users may also be referred to herein as player actors.

Consumers are not always users. For example, a bystander may be a passive viewer who does not interact with the content or influence allocation or selection of content by a client device or server.

The network environment 100 may include various surround screen systems. In some embodiments, surround screen system 120 is located inside a room 150 (such as a private cinema room, a commercial movie theater, or entertainment room in a moving vessel) and includes a main screen 120a, a side screen A 120b, and a side screen B 120c. The cinema room 150 includes a media player 115 communicably connected to the WAN 102 (and/or WCN 104) and the surround screen system 120 that provides digital content. The cinema room 150 may also include a one or more audio-video cameras (e.g., 130a, 130b, 130c, and so on, where the number of cameras may be greater than the three illustrated herein) that may be equipped with optical and/or audio sensors for capturing or detecting facial/eye movement, gesture, and voice of target objects such as audience members 152, 154, 156 (and so on, where the number of audience members may be greater than the three illustrated herein).

In some embodiments, the network environment 100 may include various passenger portable devices, for example a mobile smartphone client 106 of a user who has not yet entered either of surround screen environment 150 or vehicle 160. Other client devices may include, for example, a notepad client, or a portable computer client device, a mixed reality (e.g., virtual reality or augmented reality) client device, or the VNC 162. PPDs may connect to one or more networks. For example, a PPD (e.g., 106 once the passenger enters the vehicle 160) in the vehicle 160 may connect to servers via a vehicle controller 164, a wireless access point 108, the wireless communications network 104 and the WAN 102, in which the VC 164 acts as a router/modem combination or a mobile wireless access point (WAP). For further example, in a mobile mesh network 116, PPD nodes 110, 130, 162 may include small radio transmitters that function as a wireless router. The nodes 110, 130, 162 may use the common Wi-Fi standards to communicate wirelessly with client devices, and with each other.

Mesh network nodes may be programmed with software that tells them how to interact within the larger network. By following a set of common mesh network protocols, the mesh network nodes may transport information across the network by hopping the information wirelessly from one mesh node to the next. The nodes may automatically choose the quickest and most reliable path in a process known as dynamic routing. In a wireless mesh network, only one node needs to be physically wired to a network connection like an Internet modem. That one wired node then shares its Internet connection wirelessly with all other nodes in its vicinity. Those nodes then share the connection wirelessly with the nodes closest to them. The more nodes, the further the connection spreads, creating a wireless "cloud of connectivity". In general, client devices may be, or may include, computers or media players used by users to access media content provided via a server or from local storage. In traveling vehicles such as the example vehicle 160 and other vehicles sharing the mesh network, use of a mobile mesh network protocol may enable nearby vehicles to share network bandwidth and information more efficiently using different frequencies and cached content.

Figure 2A:
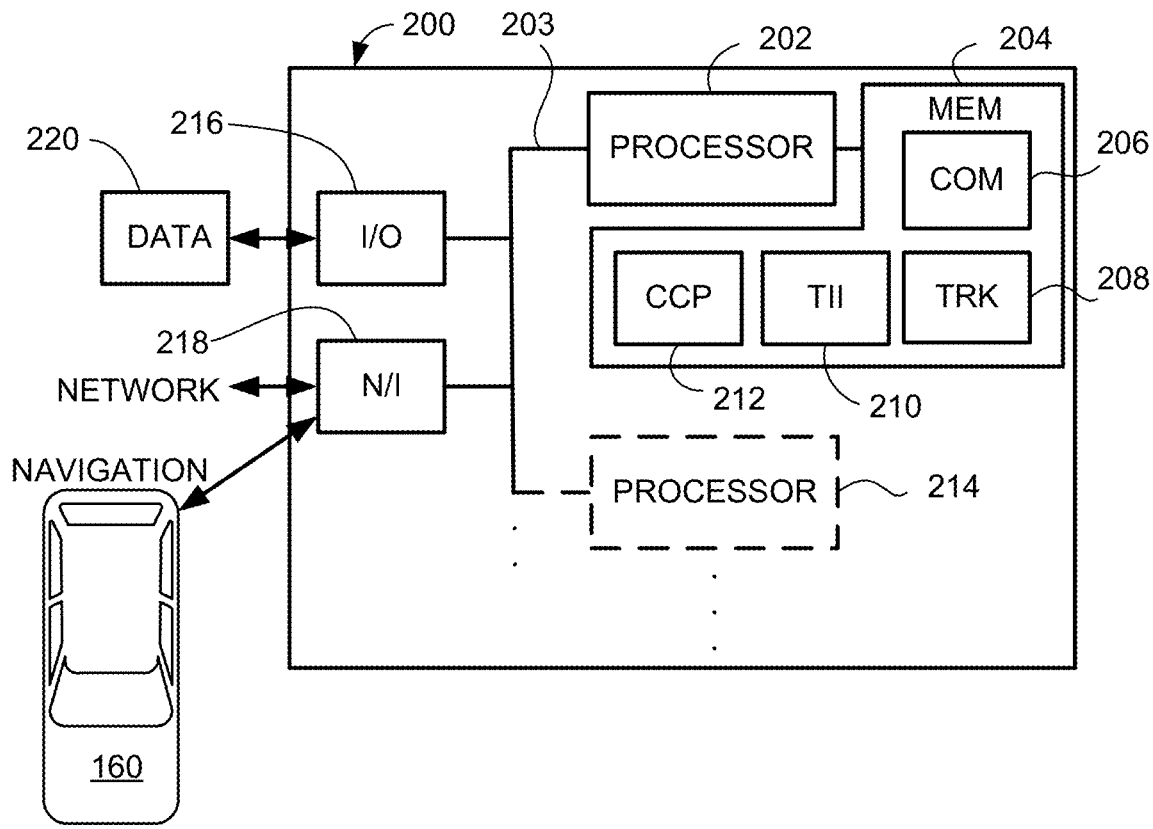
FIG. 2A is a schematic block diagram illustrating aspects of a server for delivering digital content.

FIG. 2A shows a digital content server 200 for controlling output of digital media content, which may operate in the environment 100, for example as an VMC 162 or content server 122, 126, 128, in similar networks, or as an independent server. The server 200 may include one or more hardware processors 202, 214 (two of one or more shown). Hardware may include firmware. Each of the one or more processors 202, 214 may be coupled to an input/output port 216 (for example, a Universal Serial Bus port or other serial or parallel port) to a source 220 for sensor data indicative of vehicle states, users' emotional states and viewing history. Vehicle states may include road conditions, location, multi-axial velocity and/or acceleration, estimated arrival time, destination, and other information. Viewing history may include a log-level record of variances from a baseline script for a content package or equivalent record of control decisions made in response to player actor emotional states and other input. Viewing history may also include content viewed on TV, Netflix and other sources. The processor may control output of sensory content responsive to sensor data indicating a user's emotional state, for example as described in International (PCT) application Serial No. PCT/US2018/053614 by inventors hereof, incorporated by reference herein. Any source that contains a derived emotional arc may be useful for input to an emotional-reacting content control algorithm.

Some types of servers, e.g., cloud servers, server farms, or P2P servers, may include multiple instances of discrete servers 200 that cooperate to perform functions of a single server. In some embodiments, the source 220 may be separately or additionally used for sensor data indicative of vehicle or travel conditions. Suitable sources may include, for example, Global Positioning System (GPS) or other geolocation sensors, one or more cameras configured for capturing road conditions and/or passenger configurations in the interior of the vehicle 160, one or more microphones for detecting exterior sound and interior sound, one or more temperature sensors for detecting interior and exterior temperatures, door sensors for detecting when doors are open or closed, and any other sensor useful for detecting a travel event or state of a passenger.

The server 200 may include a network interface 218 for sending and receiving applications and data, including but not limited to sensor and application data used for controlling media content as described herein. The content may be served from the server 200 to a client device or stored locally by the client device. If stored local to the client device, the client and server 200 may cooperate to handle sensor data and other player actor functions. In some embodiments, the client may handle all content control functions and the server 200 may be used for tracking only or may not perform any critical function of the methods herein. In other aspects, the server 200 performs content control functions.

Each processor 202, 214 of the server 200 may be operatively coupled to at least one memory 204 holding functional modules 206, 208, 210, 212 of an application or applications for performing a method as described herein. The modules may include, for example, a communication module 206 for communicating with client devices and servers. The communication module 206 may include instructions that when executed by the processor 202 and/or 214 cause the server to communicate control data, content data, and sensor data with a client device via a network or other connection. A tracking module 208 may include functions for tracking travel events using sensor data from the source(s) 220 and/or navigation and vehicle data received through the network interface 218 or other coupling to a vehicle controller. In some embodiments, the tracking module 208 or another module not shown may track emotional responses and other interactive data for one or more passengers, subject to user permissions and privacy settings.

The modules may further include, for example, a trip information integration (TII) module 210 that when executed by the processor causes the server to perform any one or more of determining associations of digital content components with one or more parameters of scheme data indicating user-perceivable characteristics of a digital content component, which may include at least an indicator of semantic meaning relevant to one or more travel events. For example, the TII module 210 may determine input parameters including a trip destination for one or more passengers, current road conditions, and estimated remining travel duration based on data from the tracking module 208, and apply a rules-based algorithm, a heuristic machine learning algorithm (e.g., a predictive analytics algorithm or a deep neural network) or both, to create one or more sets of digital content component identifiers consistent with the input parameters. The TII module 210 may perform other or more detailed operations for integrating trip information in digital content component selection as described in more detail herein below.

The modules may include, for example, a content configuration process (CCP) module 212. The CCP module 212 may include instructions that when executed by the processor 202 and/or 214 cause the server 200 to perform one or more of configuring, processing or providing digital content for output by a media player device during the trip at least in part by at least one of selecting or configuring ones of the media components based at least in part on one or more of the trip destination and the estimated duration, and further operations as described in more detail herein below. The memory 204 may contain additional instructions, for example an operating system, and supporting modules.

Figure 2B:
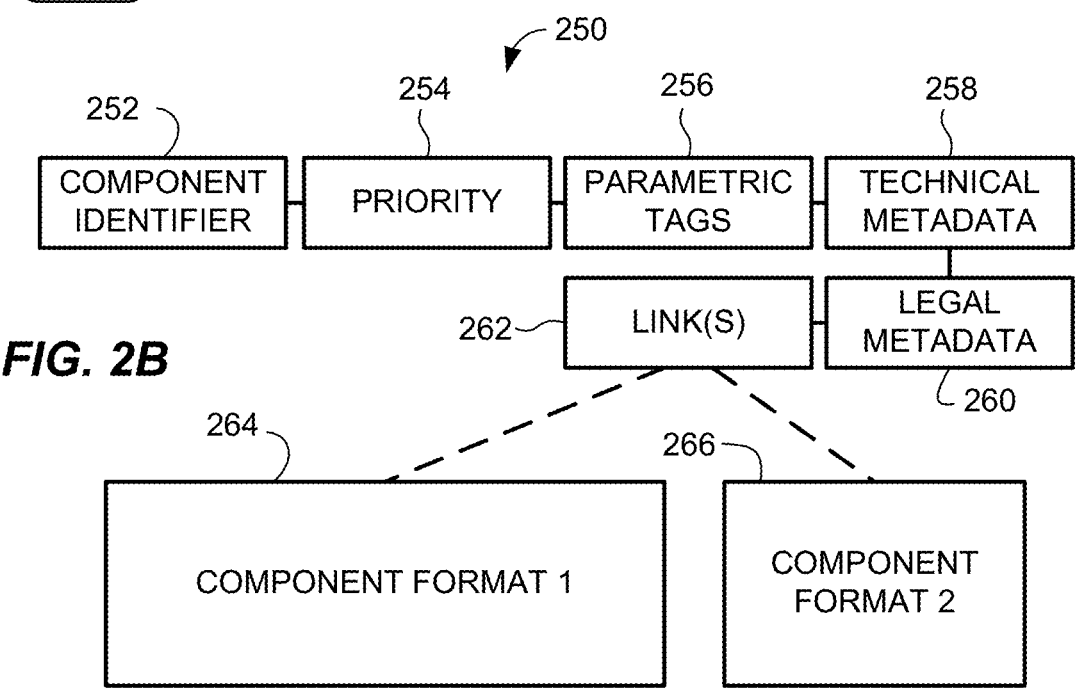
FIG. 2B is a schematic block diagram illustrating an example of a data structure for relating components of digital content configuration data to scheme data such as segregation priority and other data.

Systems, apparatus and methods as described herein may make use of a data structure that relates digital contents in an ordered arrangement of digital content components to one or more parameters for digital content, which may include at least one or more indicators of allocation priority for digital content components relevant to a surround screen system. FIG. 2B shows an example of a data structure 250 for relating components of digital content configuration data each referenced by a component identifier 252 to scheme data such as segregation priority and other data (e.g., travel event/trip information). The data structure may be implemented as a relational database, a flat data table, a distributed ledger, or by any other useful computer-readable digital data structure for storing, locating and accessing related components of binary-encoded data. The data structure 250 may include self-associated records each including a unique identifier 252 of a digital content component (e.g., an index number), a duration value (e.g., frames or seconds; not shown) of a digital segment if applicable, one or more parametric tags 256 (e.g., semantic tags) relevant to travel event information, technical metadata 258 as needed to select, configure or produce digital content package that includes the digital content component identified by the identifier 252, legal metadata such as for example license or censorship requirements applicable to the media component, and one or more links to non-transitory, computer-readable copies 264, 266 of the media component. The copies 264, 266 may be identical copies for redundancy or more efficient distribution, may be copies in different formats (e.g., a large format 264 and a small format 266) for different output modes, or both. The output may also rely on metadata or other indicia to derive a subset of a component copy, e.g. a video image formatted in a non-native aspect ratio to fit a display, or a multichannel audio stream for rendering on a stereo system. It may be efficient to store the copies 264, 266 in a different storage system than the metadata 250 for more efficient operation of the server 200. For example, the server 200 may load the data structure 250 into its Random Access Memory (RAM) and access the component copies 264, 266 on a remote server or local magnetic or electronic memory device.

Figure 3:
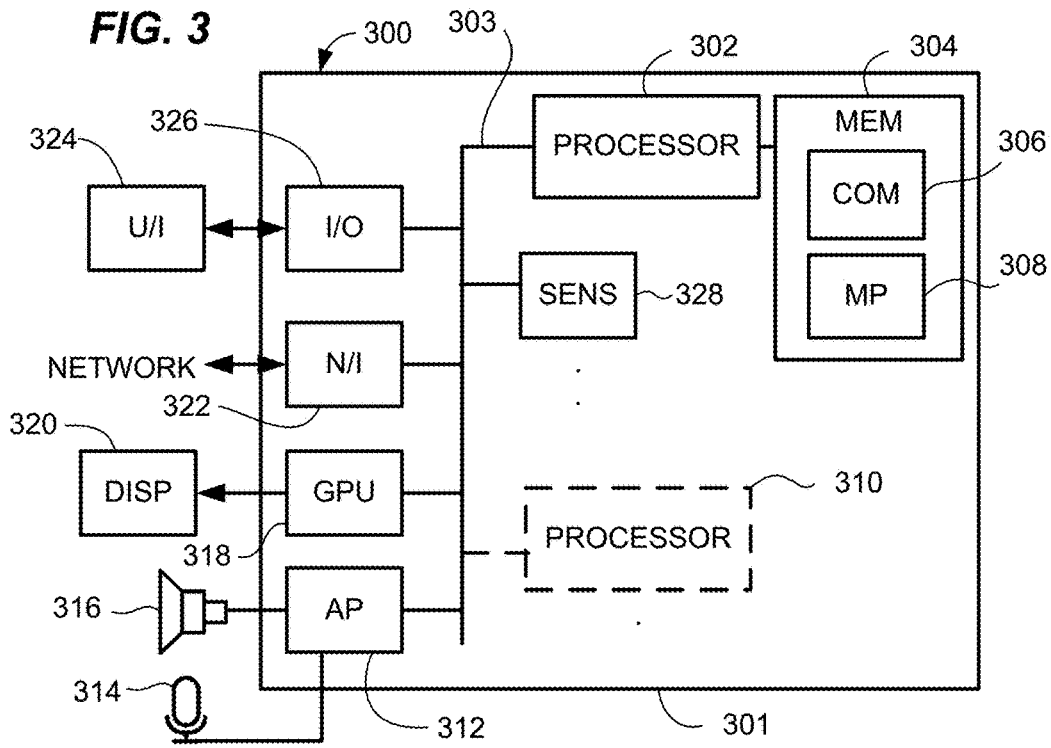
FIG. 3 is a schematic block diagram illustrating aspects of a client device for controlling output of digital content.

FIG. 3 shows aspects of a content consumption device (client) 300 for controlling output of digital media content. In some embodiments, the same computing device (e.g., device 300) may operate both as a content consumption device and as a content configuration server, for example, as a node of a mesh network. In such embodiments, the computing device may also include functional modules and interface devices as described above for the server 200.

The apparatus 300 may be located in or on a vehicle (e.g., vehicle 160), in a room 150, or other suitable locations. The client 300 may include a processor 302, for example a central processing unit based on 80×86 architecture as designed by Intel™ or AMD™, a system-on-a-chip as designed by ARM™, or any other suitable microprocessor(s). The processor 302 may be communicatively coupled to auxiliary devices or modules of the content consumption apparatus 300, using a bus or other coupling. In some aspects, the processor 302 and its coupled auxiliary devices or modules may be housed within or coupled to a housing 301, for example, a housing having a form factor of a dashboard inside an automobile, an onboard infotainment system inside an automobile (e.g., an entertainment system built in or connected to a passenger seat, the ceiling, or any other part of a vehicle), a kiosk, an elevator infotainment display, a digital signage, an in-flight entertainment system, an amusement ride, seats in cinema (e.g., 2D/3D/4D cinema) venues, a television, a set-top box, a smartphone, a tablet, wearable goggles, glasses, visor, or other form factors.

A user interface device 324 may be coupled to the processor 302 for providing user control input to a process for controlling output of digital media content in response to travel event information. The process may include outputting video and audio for a conventional flat screen or projection display device. In some aspects, the media control process may include outputting audio-video data for an immersive mixed reality content display process operated by a mixed reality immersive display engine executing on the processor 302. For further example, the process may include outputting haptic control data for a haptic glove, vest, or other wearable; motion simulation control data, or control data for an olfactory output device such as, for example, an Olorama™ or Sensoryco™ scent generator or equivalent device.

User control input may include, for example, selections from a graphical user interface or other input (e.g., textual or directional commands) generated via a touch screen, keyboard, pointing device (e.g., game controller), microphone, motion sensor, camera, or some combination of these or other input devices represented by block 324. Such user interface device 324 may be coupled to the processor 302 via an input/output port 326, for example, a Universal Serial Bus (USB), Bluetooth®, Wi-Fi™, or equivalent ports. Control input may also be provided via a sensor 328 coupled to the processor 302. The sensors 328 may comprise, for example, a motion sensor (e.g., an accelerometer), a position sensor, a camera or camera array (e.g., stereoscopic array), a biometric temperature or pulse sensor, a touch (pressure) sensor, an altimeter, a location sensor (for example, a Global Positioning System (GPS) receiver and controller), a proximity sensor, a motion sensor, a smoke or vapor detector, a gyroscopic position sensor, a plenoptic camera, a radio receiver, a multi-camera tracking sensor/controller, an eye-tracking sensor, an infrared/heat signature sensor, a microphone or a microphone array. In some aspect, any or all of the sensors 328 may be housed in a single or multiple devices, such as a smartphone and the like.

In some implementations, the sensors 328 may be located inside the vehicle, outside (e.g., on the exterior of) the vehicle, or both. For example, accelerometers, bump cancelling sensors, audio/noise canceling sensors, and/or light canceling sensors may be located outside, and position sensors (e.g., sensing position(s) of passenger(s)), depth sensors, gesture sensors (e.g., Kinect™ by Microsoft Corporation in Redmond, WA), and/or microphone(s) may be located inside, the vehicle 100. For example, a smartphone device, an IoT device, a smart device (e.g., Apple Watch by Apple, Inc, Google Home by Google, Inc., Amazon Echo by Amazon, Inc., etc.) or other network-enabled device may house and provide or augment functionalities of one or more of the foregoing sensors. The sensor or sensors 328 may detect biometric data used as an indicator of the user's emotional state, for example, facial expression, skin temperature, pupil dilation, respiration rate, muscle tension, nervous system activity, or pulse. In addition, the sensor(s) 328 may detect a user's context, for example an identity position, size, orientation and movement of the user's physical environment and of objects in the environment, motion or other state of a user interface display, for example, motion of a virtual-reality headset. The sensor or sensors 328 may generate orientation data for indicating an orientation of the apparatus 300 or a passenger using the apparatus. For example, the sensors 328 may include a camera or image sensor positioned to detect an orientation of one or more of the user's eyes, or to capture video images of the user's physical environment or both. In some aspect, a camera, image sensor, or other sensor configured to detect a user's eyes or eye movements may be integrated into the apparatus 300 or into ancillary equipment coupled to the apparatus 300. The one or more sensors 328 may further include, for example, an interferometer positioned in the support structure 301 or coupled ancillary equipment and configured to indicate a surface contour to the user's eyes. The one or more sensors 328 may further include, for example, a microphone, array or microphones, or other audio input transducer for detecting spoken user commands or verbal and non-verbal audible reactions to output of the media content.

The apparatus 300 or a connected server may track users' biometric states and viewing history. Viewing history may include a log-level record of control decisions made in response to player actor biometric states and other input. Viewing history may also include content viewed on TV, Netflix™ and other sources. The server 200 may track user actions and biometric responses across multiple content titles for individuals or cohorts.

Sensor data from the one or more sensors may be processed locally by the CPU 302 to control display output, and/or transmitted to a server 200 for processing by the server in real time, or for non-real-time processing. As used herein, "real time" refers to processing responsive to user input without any arbitrary delay between inputs and outputs; that is, that reacts as soon as technically feasible. "Non-real time" refers to batch processing or other use of sensor data that is not used to provide immediate control input for controlling the display, but that may control the display after some arbitrary amount of delay.

To enable communication with another node of a computer network, for example the media content server 200, the client 300 may include a network interface 322, wired or wireless. Network communication may be used, for example, to enable multiplayer experiences, including immersive or non-immersive experiences of media content. The system may also be used for other multi-user applications, for example social networking, group entertainment experiences, instructional environments, video gaming, and so forth. Network communication can also be used for data transfer between the client and other nodes of the network, for purposes including data processing, content delivery, content control, and tracking. The client may manage communications with other network nodes using a communications module 306 that handles application-level communication needs and lower-level communications protocols, preferably without requiring user management.

A surround screen system 320 may be coupled to the processor 302, for example via a graphics processing unit 318 integrated in the processor 302 or in a separate chip. The surround screen 320 may include, for example, a flat screen color liquid crystal (LCD) display illuminated by light-emitting diodes (LEDs) or other lamps, a projector driven by an LCD display or by a digital light processing (DLP) unit, a laser projector, or other digital display device. The display 320 may be incorporated into a virtual reality headset or other immersive display system. Video output driven by a mixed reality display engine operating on the processor 302, or other application for coordinating user inputs with an immersive content display and/or generating the display, may be provided to the surround screen 320 and output as a video display to the user. Similarly, an amplifier/speaker or other audio output transducer 316 may be coupled to the processor 302 via an audio processor 312. Audio output correlated to the video output and generated by the media player module 308, media content control engine or other application may be provided to the audio transducer 316 and output as audible sound to the user. The audio processor 312 may receive an analog audio signal from a microphone 314 and convert it to a digital signal for processing by the processor 302. The microphone can be used as a sensor for detection of biometric state and as a device for user input of sound commands, verbal commands, or for social verbal responses to passengers. The audio transducer 316 may be, or may include, a speaker or piezoelectric transducer integrated to the apparatus 300. In an alternative or in addition, the apparatus 300 may include an audio output port for headphones or other audio output transducer mounted ancillary equipment such as a smartphone, VMC, xR headgear, or equivalent equipment. The audio output device may provide surround sound, multichannel audio, so-called 'object-oriented audio', or other audio track output from the media content.

The apparatus 300 may further include a random-access memory (RAM) 304 holding program instructions and data for rapid execution or processing by the processor, coupled to the processor 302. When the device 300 is powered off or in an inactive state, program instructions and data may be stored in a long-term memory, for example, a non-volatile magnetic, optical, or electronic memory storage device (not shown). Either or both RAM 304 or the storage device may comprise a non-transitory computer-readable medium holding program instructions, that when executed by the processor 302, cause the device 300 to perform a method or operations as described herein. Program instructions may be written in any suitable high-level language, for example, C, C++, C#, JavaScript, PHP, or Java™, and compiled to produce machine-language code for execution by the processor. The memory 304 may also store data, for example, audio-video data in a library or buffered during streaming from a network node.

Program instructions may be grouped into functional modules 306, 308, to facilitate coding efficiency and comprehensibility, for example, a communications module 306 and a media player module 308. The modules, even if discernable as divisions or grouping in source code, are not necessarily distinguishable as separate code blocks in machine-level coding. Code bundles directed toward a specific type of function may be considered to comprise a module, regardless of whether machine code on the bundle can be executed independently of other machine codes. The modules may be high-level modules only. The media player module 308 may perform operations of any method described herein, and equivalent methods, in whole or in part. Operations may be performed independently or in cooperation with another network node or nodes, for example, the server 200.

Figure 4A:
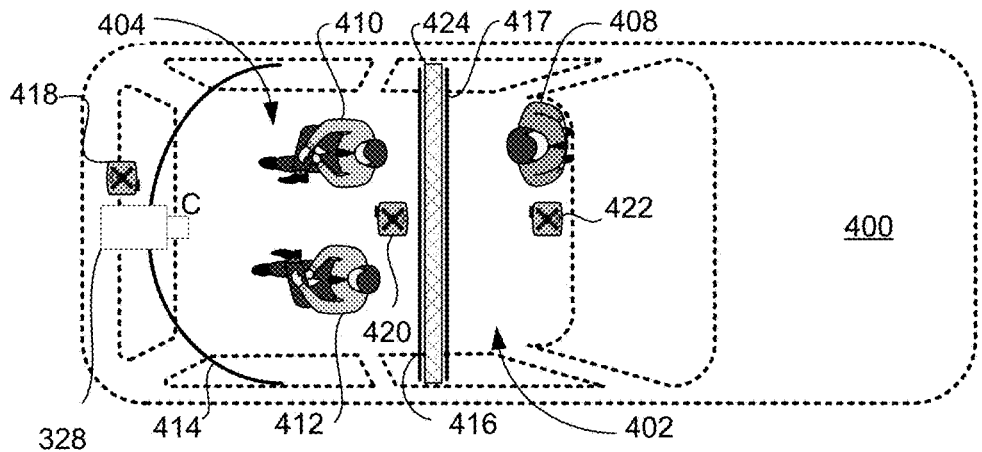
FIG. 4A is a schematic diagram showing features of a human-piloted vehicle equipped with a surround screen for passenger entertainment.

In a motor vehicle, the apparatus 300 may provide digital content for projection onto an interior surface (or one or more screens installed thereabout) of the vehicle as the surround screen 320. For example, in a vehicle 400 shown in FIG. 4A, one or more ceiling-mounted projectors 418, 420, 422 may project digital content from the apparatus 300 onto corresponding screens 416, 414, 417. In the illustrated configuration, two passengers 410, 412 sit in a passenger space 404 while a driver 408 occupies a cockpit 402. The cockpit 402 may be isolated from the passenger space 404 by a sound wall 424. The projector 422 may project video from rear-facing cameras of the vehicle 400, showing the rear view for the driver. The projector 420 may project forward digital media content from the apparatus 300 onto a forward surround screen 414. The projector 418 may project rear media content coordinated in time to the forward digital media content onto the rear screen 416. In this context, "forward" and "rear" are relative to the passengers' 410, 412 orientations, not the vehicle 400 orientation. Passenger and vehicle orientations may be aligned or non-aligned as shown in FIG. 4A. The rear screen 416 and forward screen 414 may be mounted on tracks enabling separation of the screens 414, 416 to admit or release passengers, and closure to enable a fuller surround view, up to and including a full 360° surround view. For example, instead of being located behind passengers 410 and 412, the screen 416 may consist of one or more separate screens located in a position other than in the "forward" position with respect to the passengers, such that the plurality of screens 416 provide a surround screen view of the digital content for the passengers. In some embodiment, for example, the screens 416 may be installed on one or more of the rear passenger windows, front passenger windows, sunroof, moonroof, or anywhere other than the forward screen 414 in the vehicle 400.

In driverless (e.g., autonomous vehicle) configurations, the sound wall 424, rear view screen 417, projector 422, driver 408 and cockpit 402 are omitted, and the entire cabin of the vehicle 400 may function as a passenger entertainment space 404. In driverless embodiments, the rear projection screen 416 may be a surround screen like the forward screen 414. In some instances, the rear projection screen 416 may be located on or near the windshield of the vehicle 400.

Figure 4B:
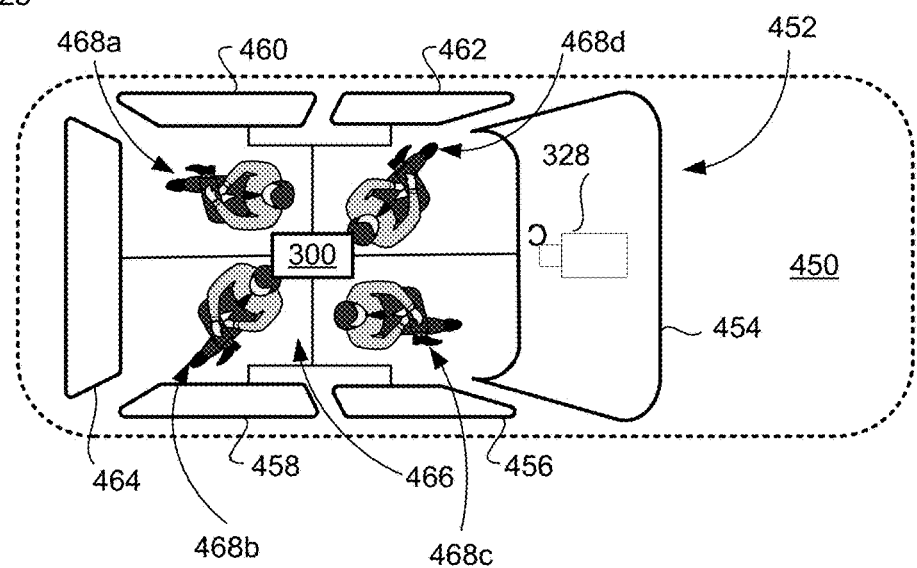
FIG. 4B is a schematic diagram showing features of an autonomous vehicle equipped with a surround screen system for passenger entertainment.

Instead of or in addition to projection screens, electronic display screens may be used for surround screen system 320, for example, LCD or OLED screens in various resolutions, color spaces and dynamic ranges. In driverless vehicles, the cabin is easily darkened so either projectors or electronic screens should work well. FIG. 4B shows a configuration of an autonomous vehicle 450 in which the window screens are replaced by LCD screens 452, including a front screen 454, right side screens 456, 458 (one on each door) left side screens 460, 462 (one on each door) and a rear screen 464. One or more of the screens 452 may be transparent or partially transparent LCD or OLED panels (also called see-through displays) for augmenting the natural view of the vehicle exterior, may have an opaque backing for virtual reality, or may include an electronic or mechanical shutter to transition between opaque and transparent or partially transparent states. One or multiple LCD layers may be used as an electronic shutter to transition between opaque and transparent states. An apparatus 300 (for example, a VMC 162) may be coupled to the screens 452 for controlling video output. One or more passengers 468a-468d in the cabin 466 may view digital content as if looking through the window, in see-through or opaque modes. In alternative embodiments, the vehicle windows are equipped with mechanical or electronic shutters to darken the cabin, and the apparatus 300 outputs the video content to traditional LCD or OLED screens in an interior to the vehicle, or to projectors as shown in FIG. 4A. In an alternative or in addition, each of the passengers 468a-468d may consume the digital content on a personal computing device, for example a smartphone, notepad computer or mixed reality headset. The innovative methods, apparatus and systems described herein are not limited to a single form factor but may be used in any video output device suitable for digital content output for surround screen.

In some embodiments, the passengers (e.g., 468a-468d, and so on) may or may not be facing the same direction or looking at the same screen. For example, as shown in an example in FIG. 4B, passenger 468a is facing or looking toward screen 464, passenger 468b facing or looking toward screen 458, passenger 468c facing or looking toward screen 454, and passenger 468d facing or looking toward screen 462. The directions that one or more passengers may be facing, or the directions of gaze of the passenger(s), may be detected by the apparatus 300 via one or more sensors 328, which may be strategically positioned in or on the vehicle 450 (or vehicle 400, similarly in the example of FIG. 4A above) to do so. As a result, in the example of FIG. 4B, the apparatus 300 may determine that screen 464 is the main screen for passenger 468a, screen 458 is the main screen for passenger 468b, screen 454 is the main screen for passenger 468c, and screen 462 is the main screen for passenger 468d, based on the detected direction that the respective passenger is facing, or the detected direction of the gaze. Further, the apparatus 300 may provide or serve different parts of the digital content to different output devices (e.g., screens 452, audio transducer 316, etc.) based at least in part on the detected information.

In addition to conventional 2D output or 3D output for display on two-dimensional (flat or curved) screens (e.g., by televisions, mobile screens, or projectors), the digital content processing and providing methods disclosed herein may be used with virtual reality (VR), augmented reality (AR) or mixed reality output devices (collectively referred to herein as xR). Some immersive xR stereoscopic display devices include a tablet support structure made of an opaque lightweight structural material (e.g., a rigid polymer, aluminum or cardboard) configured for supporting and allowing for removable placement of a portable tablet computing or smartphone device including a high-resolution display screen, for example, an LCD or OLED display. Other immersive xR stereoscopic display devices use a built-in display screen in a similar frame. Either type may be designed to be worn close to the user's face, enabling a wide field of view using a small screen size such as in smartphone. The support structure may hold a pair of lenses in relation to the display screen. The lenses may be configured to enable the user to comfortably focus on the display screen which may be held approximately one to three inches from the user's eyes. The device may further include a viewing shroud (not shown) coupled to the support structure and made of a soft, flexible or other suitable opaque material for form fitting to the user's face and blocking outside light. The immersive VR stereoscopic display device may be used to provide stereoscopic display output, providing a more immersive perception of 3D space for the user.

FIG. 4C is a graphic rendering of an example surround screen including a main screen 414 (or 454, 464), and a sub-screen 430, inside a vehicle (e.g., vehicle 160). In an aspect, a passenger named Mark has just boarded the vehicle, and he is greeted by an avatar of the vehicle named Alfred with audio-visual message on the surround screen. Sub-screen 430 may display navigation information for the trip that Mark is about to take on the vehicle. Further aspects of this scenario are described below in connections with FIG. 8.

Figure 4D:
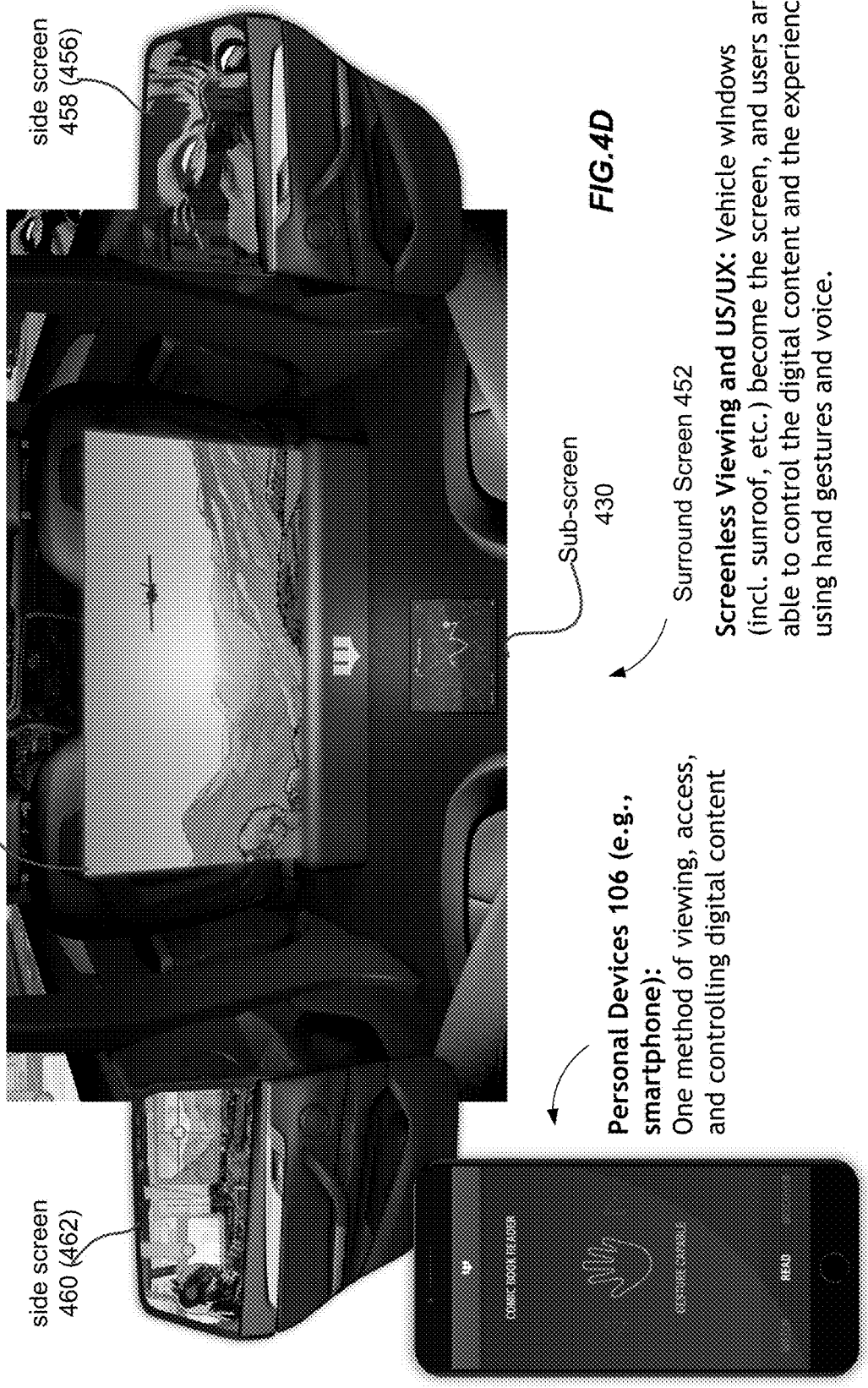
FIG. 4D is graphic rendering of another example surround screen including a main screen and two side screens, a sub-screen, and a personal device, useful for providing AV viewing and interaction surfaces, etc.

FIG. 4D is a graphic rendering of another example surround screen including main screen 414 and two side screens 460 (462) and 458 (456), a sub-screen 430, and a personal device 106, inside the same vehicle as in the example of FIG. 4D, showing a useful surround screen arrangement for providing AV viewing and interaction surfaces, etc. Further aspects of this arrangement, in an example context of Mark's travel, are described below in connections with FIG. 8.

Figure 4E:
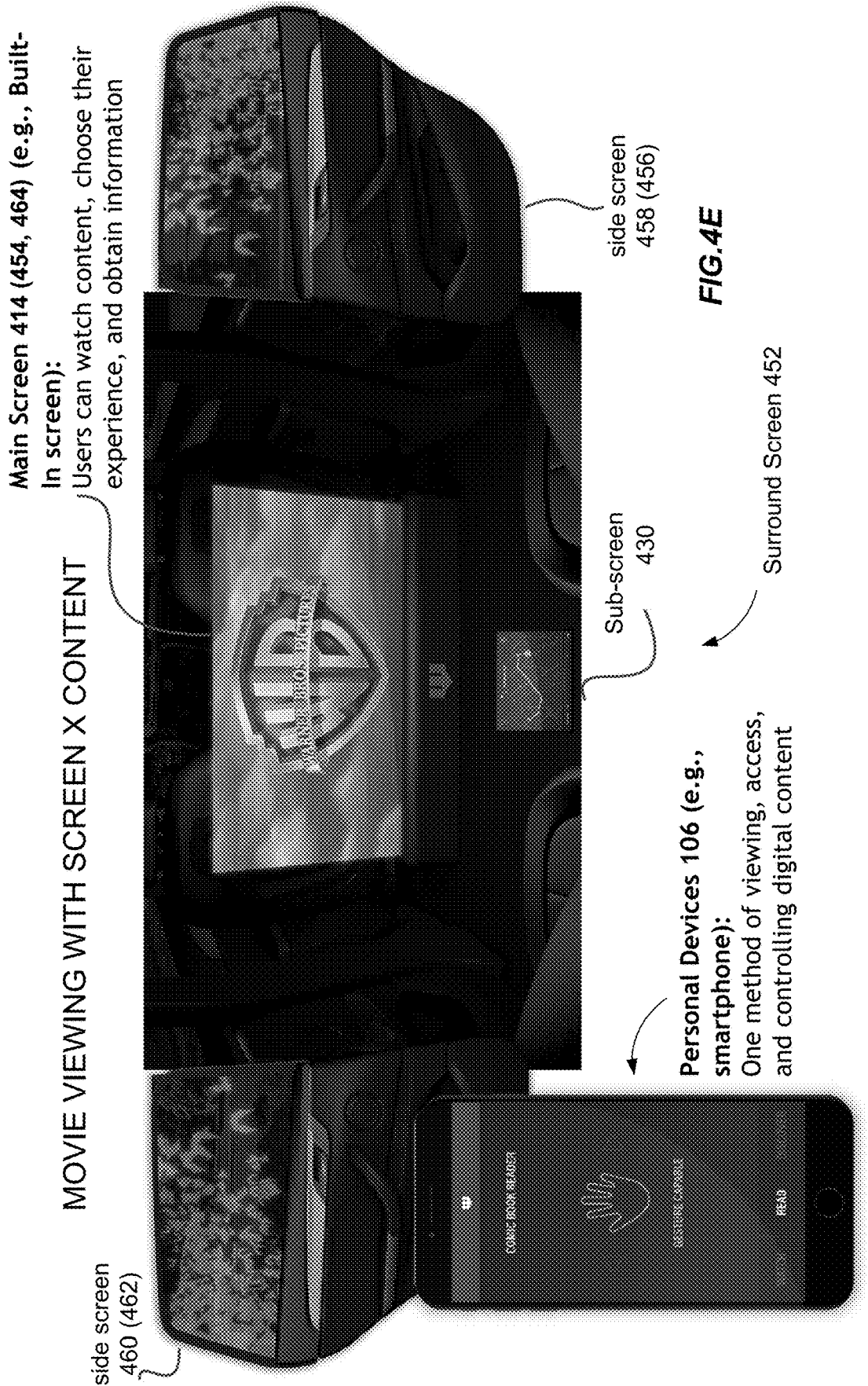
FIG. 4E is graphic rendering of an example surround screen including a main screen and two side screens, a sub-screen, and a personal device, useful for providing movie viewing with a surround screen content, etc.

FIG. 4E is a graphic rendering of yet another example surround screen including main screen 414 and two side screens 460 (462) and 458 (456), a sub-screen 430, and a personal device 106, inside the same vehicle as in the example of FIG. 4D, showing a useful surround screen arrangement for providing movie viewing with a surround screen content, etc. Further aspects of this arrangement, in an example context of Mark's travel, are described below in connections with FIG. 8.

Figure 5:
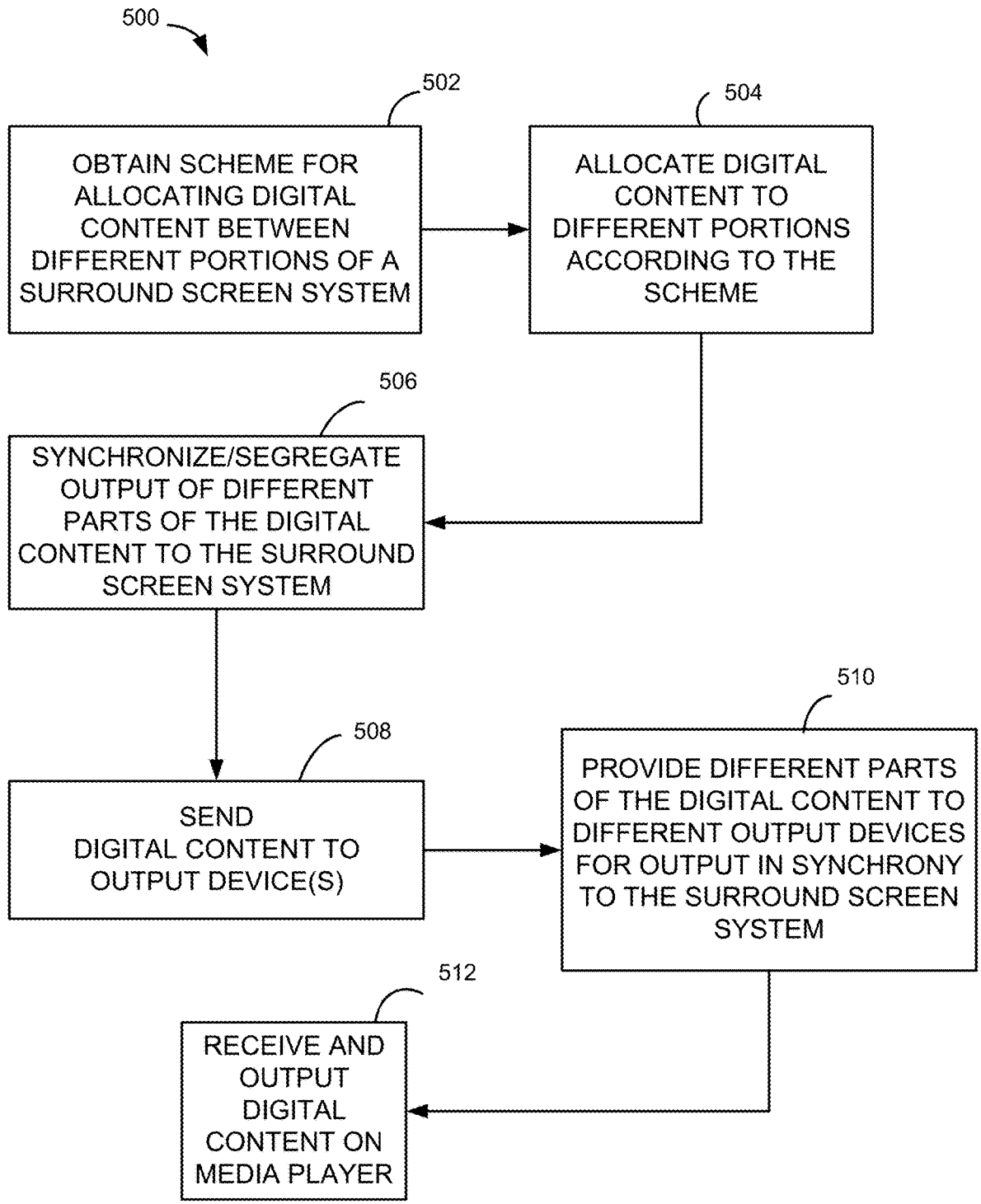
FIG. 5 is a schematic diagram illustrating an overview of processing, by one or more processors, digital content customized for a surround screen output.

The apparatus 200 and 300 may perform methods for processing or providing digital content for a surround screen output or system, each alone, or working in cooperation. FIG. 5 shows an overview 500 of processing, by one or more processors, digital content customized for a surround screen output. The method 500 may be performed by one or more computer processors of a media player in electronic communication with a connected vehicle (e.g., vehicle 160) and/or a room (e.g., room 150) and servers. The servers may be found at points of interests along the travel route, and/or an independent server of the vehicle not in electronic communication with other vehicle or servers at points of interests. At the process 502, the one or more processors obtain a scheme for allocating digital content between different portions of a surround screen system. For example, the one or more processors may select the scheme from a library, or generate the scheme using an algorithm, based on a sensed configuration of the surround screen system and any ancillary output devices that will participate in the session. The ability to use multiple schemes enables adaptation of content to different configurations of surround screens, ancillary output devices, and user preferences. The scheme may be in a data structure of any useful type, for example as described herein above in relation to FIG. 2B. In an aspect, the digital content may include a defined narrative such as audio video work, for example a movie, a comic book, an episode of a serial drama, a documentary, an infomercial, a video game, an advertisement, a talk show or social game, or other programs, animated or not. The data structure may further include an ordered arrangement of digital content components for the digital content, for example audio-video clips or an episode of a series and the like.

At the process 504, the method may further include allocating digital content to different portions of a surround screen system according to the scheme. The scheme for allocating may be represented in a data structure, for example data structure 250 shown in FIG. 2B. An equivalent or different list may also be suitable. In some embodiments, the processor may associate components of digital contents with a logical address (e.g., position) of the component in a narrative tree. The narrative tree may be an organized and/or ordered listing of media segments, for example based on chronological order of the segments within the narrative, including one or more branches leading to alternative storylines. In an aspect, other metadata for the media segment may include, for example, an episode identifier of a program series, ratings, genre, and so on.

At the process 506, the method may include synchronizing/segregating output of different parts of the digital content to the surround screen system. In an aspect, the different parts of the digital content may refer to main content which may be preferentially provided to the main screen, and separate contemporaneous contents that may be generated for each of the output devices and preferentially provided to other screens of the surround screen system. In some implementations, all the different parts of the digital content may be provided to any of the different portions of the surround screen system.

At the process 508, the method may include sending digital content to output device(s), such as the screens, speakers, 4D chairs, sub-screens, PPDs, etc. The method also include selecting or configuring, and producing the digital content based in part on the specifications of the media player at each vehicle, for example whether the media player has 3D or xR capabilities.

At the process 510, the method may include providing (e.g., streaming) different parts of the digital content to ancillary output devices for output in synchrony to the surround screen system. At the process 512, the method may include a media player device at the connected vehicle receiving and outputting the digital content at the start, during or at the destination of the trip, or a media player device at a room receiving and outputting digital content at a designated show time.

In an aspect, one or more processors at the content server may perform one or more of the processes 502-512. In another aspect, one or more processors at the connected vehicle (e.g., vehicle 160) or the room (e.g., room 150) may perform one or more of the processes 502-512. The following descriptions of these processes may apply to either the content server or the client (e.g., vehicle, room, etc.), unless noted otherwise.

Figure 6A:
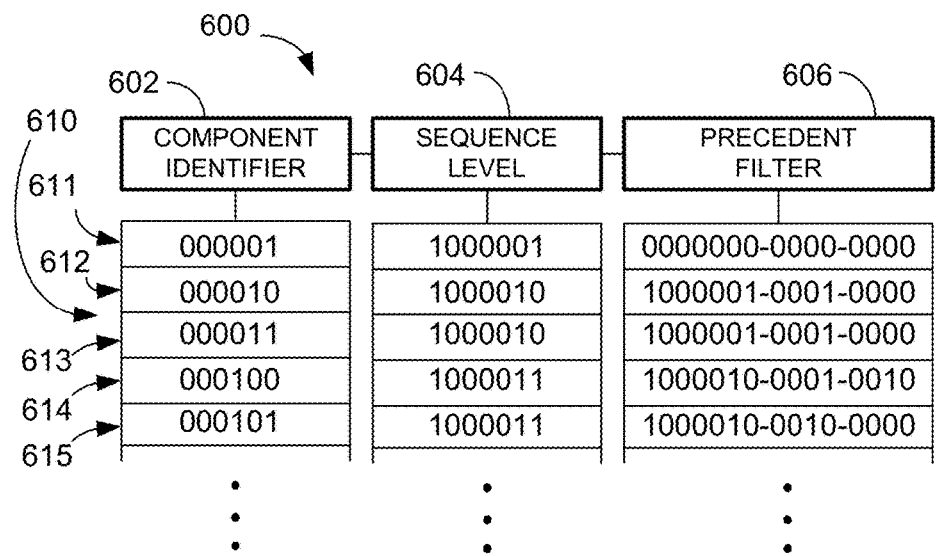
FIG. 6A is a diagram illustrating aspects of a narrative tree data structure for use by one or more processors in determining a logical address of a digital content component in a narrative tree.

FIG. 6A shows aspects of a narrative tree data structure 600 for use by one or more processors in determining a logical address of a digital content component in a narrative tree, illustrated as a binary data table representing a directed acyclic graph. A first column 602 holds component identifiers, for example, an index or serial number that is unique for the set of media components of the digital content. In an aspect, the identifier may represent a link to a copy of the component. In this example, the column 602 holds a sequence of integers 1, 2, 3 . . . expressed as binary data.

A second column 604 holds at least one narrative level assigned to each digital content component. Each level may be expressed as one value of an uninterrupted linear sequence, for example the sequence of integers 1, 2, 3 . . . expressed as binary data. To provide a tree structure, at least one digital content component is assigned to each level, and more than one digital content component is assigned to at least one of the levels. In many narrative structures, multiple unique components are assigned to most levels and each digital content component is assigned to only one level. In some embodiments, a digital content component may be assigned to multiple narrative levels.

A third column 606 may hold filter criteria for determining eligible digital content components based on a current narrative level and an identity of a most recent digital content component last played. In this example, three values are used in the third column 606, displayed as binary numbers separated by dashes. The first value is the prior level identifier, the second value identifies a first segment of a range, and the third value is null ('0000') or identifies a last segment of the range. The range values may be based on the position of each segment in the level, for example, a first position in the level may be identified as '0001,' a second position as '0010,' and so forth.

The rows 610 hold example values in each column to demonstrate application of the data structure 600, for a list of digital content components beginning with an initial "Segment 1" in row 611, column 602. At row 611, column 604, Segment 1 is assigned to "Level 1," the first level in the tree. The third column 60 is filled with null values indicating no eligible prior components in the tree 600. A "Segment 2" in the second row 612 at column 602 is associated by the table 600 to a second "Level 2" at column 604, as is "Segment 3" at row 613, column 604. At row 612, column 606, three values indicate that Segment 2 is eligible to follow Level 1, Segment 1. The same is indicated at row 613, column 606 for Segment 3, because Level 1 holds only one segment. Segments 4 and 5 at rows 614, 615 respectively are likewise assigned to Level 3. At column 606, row 614, Segment 4 is indicated as eligible to follow the first segment of Level 2 only, which is Segment 2. At column 600, row 615, Segment 5 is indicated as eligible to follow the first or second segments of Level 2, which is Segments 2 or 3. The data structure 600 may be continued for additional digital content components in like fashion, and may be extended for use with surround screens by adding screen identifiers as an independent column and filter criterion for each segment.

Figure 6B:
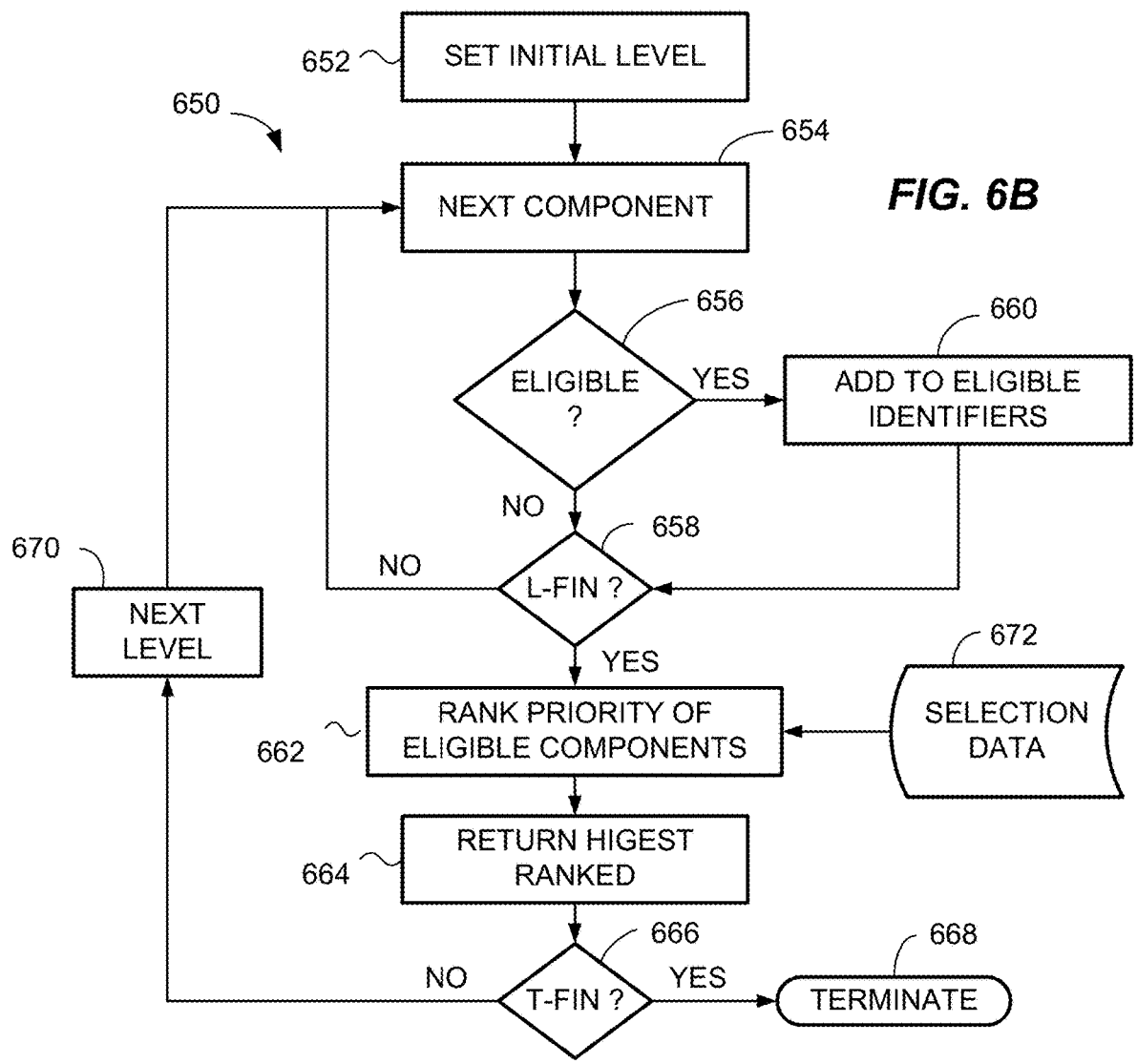
FIG. 6B is a flow chart showing an algorithm for selecting a digital content component based on an address in a narrative tree.

FIG. 6B shows a method or algorithm 650 for selecting a digital content component based on an address in a narrative tree. The method 650 may be used as part of an algorithmic scheme for allocating content to surround screens by classifying components to eligible screens. For example, while playing the main narrative on the main screen, the processor may select a flashback or related dream sequence to play on a side screen or ancillary screen. At 652, a processor sets an initial level of a narrative for a sequence of digital content components. Often this will be the tree's first level but may be a lower level when the narrative has been interrupted and is resuming later. At 654, the processor picks the first or next component in the level, for example, in order of a level sequence identifier or in order of the component identifier. At 656, the processor may determine whether each digital component is eligible for play in the current loop, for example by applying a filter as described in connection with column 606 in FIG. 6A. At 660, if the component is eligible for the level, the processor may place its identifier in a memory cache as one of a list (e.g., level-eligible components list). At 658, if all the components in the level have not been considered, the processor at 654 picks the next component for filtering. If all the components in the level have been picked, the processor at 662 may rank the eligible components based on any applicable selection data 672 that serve as rendering parameters for the digital content, for example, where in the surround screen an audience member is gazing or looking at while consuming the digital content at any given time, duration of the gaze, center of the gaze, a position of the digital content component's assigned node in the narrative tree, which of the different portions of the surround screen system is closest to the center of gaze of an audience member, trip data (e.g., relating to motion of the surround screen system, whether in a moving or stationary vehicle or room), user input, biometric data (e.g., from one or more audience members indicating a neurological response), a profile of video content (e.g., on a highest-priority portion of the digital content) or any useful combination of the foregoing. In some implementations, the processor may rank by various criteria, for example, by degree of relation to a travel component; closest predicted adherence to a targeted story arc for emotional responses, closest data distance to a set of user preferences; of a combination of the foregoing factors. In alternative embodiments, the processor may rank the components based on a predictive machine-learning algorithm trained over a training set to achieve a target objective including maximizing one or more of the ranking criteria noted above. At 664, the processor may return a value of the highest ranked digital content component for use in assembling digital content (digital content package) for play by a media player (e.g., in vehicle 160 or room 150). At 666, the processor may determine whether it is finished selecting digital content components from the narrative tree. If it is not finished, the processor may select the next level at 670, clear the cache of eligible components or start a new list for the next level and continue at 654. If it is finished, the processor may terminate the method 650 at 668.

Figure 7:
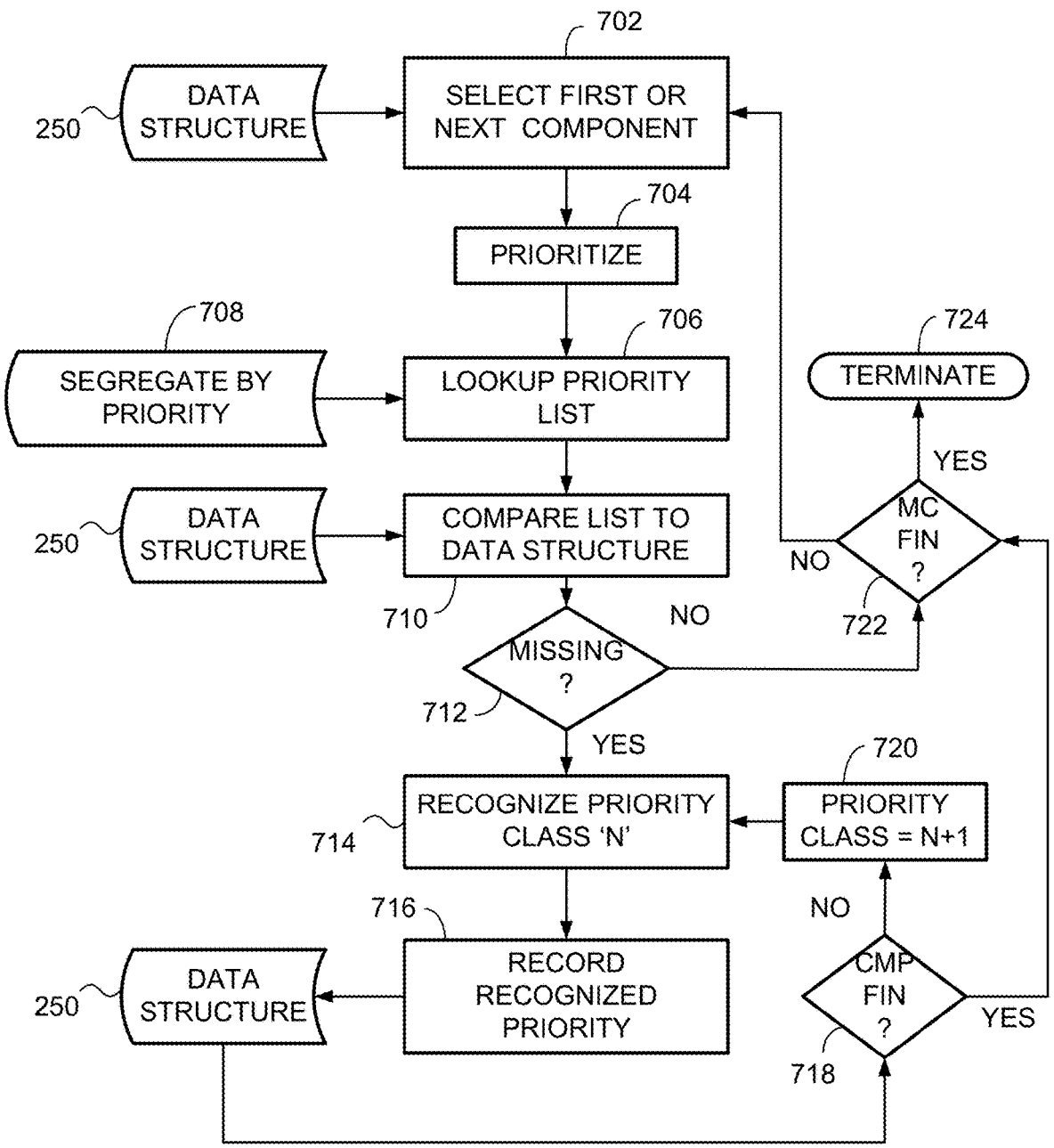
FIG. 7 is a flow chart illustrating aspects of associating by one or more processors a digital content component with a scheme.

FIG. 7 shows aspects of an algorithm or method 700 for associating by one or more processors a digital content component with a scheme. Scheme may include, for example: display or screen format (e.g., aspect ratios such as 16:9 HDTV format, 4:3 video format, 1:1.85 wide screen, 1:2.35 cinemascope, a standard rectangular screen, overhead projector 1:1, non-standard screens such as vehicle window displays, a virtual headgear, a 70 mm motion picture, etc.); position of view or gaze by an audience; form factor of screen; geometric details or dimensions of screen; supplemental viewpoints (e.g., spreading content so main screen spills over onto side screens-"wrap," move main content around the surround screens depending on action/dialog- "pan and scan," model an environment and create a blended virtual reality, e.g., filmed content on main screen with rendered environment on side/rear/sub screens); alternative renderings; tone of a color scheme; colors or patterns displayed for mood or dramatic flair. Further, in some embodiments, scheme may include location on a time-based sliding window, e.g., for panelized content, panels ride on a "ribbon" that slides across the surround screen with the "current" panel on the front screen, or for video content, side panels show "past" clips that accentuate the main action on the front screen, which may be based on an assigned priority; position-based audio (e.g., each passenger/audience's audio feed varies depending on which screen she is looking at); travel window (e.g., GPS navigation or trip information on a sub-screen or other screen); mood of a sound track; position in a narrative tree; a duration of a segment; a subject; and identities of one or more characters or objects appearing in or represented by the digital content component. At 702, the processor may select the digital content component, for example, using a loop to pick the next or first digital content component in a list, for example, the data structure 250 shown in FIG. 2B. An equivalent or different list may also be suitable. An initial list of digital content components may be assembled by a production team. For example, it may be convenient for a production team to create and partially or completely populate a data structure 250 as shown in FIG. 2B or equivalent structure during production of components for digital content, as part of a content production process. If a complete data structure is already produced and does not need to be augmented, associating is already completed and there may be no need to execute an automatic process 700. However, some user-perceivable characteristics that form a scheme may not easily be collected or described by the production team. In addition, when converting or repurposing legacy media content (e.g., digital content converted from film, or older digital content) for use with a surround screen with the methods herein, essentially no user-perceivable characteristics may be available.

At 704-712, the processor may determine whether the component is missing any needed characteristic data. For example, at 704 the processor may determine a type of the digital content component, for example, one or more video clips, audio clips or tracks, digital files, panelized static images, 3D model, and so forth, based on metadata or based on a trained machine-learning recognition algorithm for digital data. Then, at 706 the processor may look up a list 708 of segregation priority for the type of digital content component detected. For example, the list may contain segregation priority information relevant to the scheme such as, for example, intended viewpoint or gaze of an audience for consuming the digital content. For example, a list may assign higher priority to a portion of a scene in an action movie containing an action scene and indicate that the scene is for display on the main screen, or the portion of the surround screen closest to the center of gaze of an audience. Priority information may include, for example, duration of the gaze. For example, if an audience member gazes on the digital content component for a minimum threshold duration, e.g., three seconds, the component will receive higher priority for segregation. Priority information may include, for example, position of the component's assigned node in a narrative tree. For example, in a comic book reader, the "current" frame takes higher priority and may be indicated for display on the main screen or the portion of the surround screen closest to the center of gaze of an audience, whereas the previous and next frames take lower priority and may be indicated for display elsewhere. Priority information may include, for example, trip information relating to motion or movement of the surround screen system (e.g., geographic or global positioning (GPS) location, or location or position information of the surround screen system vis-à-vis the audience/seat position and vice versa. For example, in case of Batman: Arkham Knight wherein the digital content is a VR/AR/xR game content, the priority information may indicate that the digital content (components) should be displayed on the surround screen coordinated with movement of the seats with respect to one another, such that audience members experience a simulation of driving the Bat Mobile. Priority information my include, for example, points of interest along the trip. For example, a scheme may organize content to simulate travel along an actual route traveled by a moving vehicle, or a virtual route traveled, e.g., a Mars landscape in a simulated VR field trip, "The Field Trip to Mars" by Framestore VR Studio. Priority information may include, for example, classification of content as "main" or "extra." For example, in the movie, "Aquaman," a scheme may be ordered such that the main movie content is displayed on the main screen or the portion of the surround screen closest to the center of gaze of an audience, while extra contents such as bonus features, director's cut, trailers, behind-the-scenes, making of, bloopers, memes, etc., are displayed elsewhere on the surround screen. Priority information may include, for example, play duration. For example, in case the digital content is consumed by audience members while taking a trip in a vehicle (vehicle 160), the scheme may be ordered such that the digital content will finish playing by or at end of the trip. Priority information may include, for example, classes of emotional response such as valance, arousal, or content engagement power (CEP). For example, a scheme may order content such that more engaging content is displayed on a main screen and ancillary content on side screens or auxiliary screens.

At 710 the processor may compare the list to the characteristic classes of the media component in the data structure and based on the comparison determine whether the data structure 250 is lacking any desired class of characteristics defined by list 708 for digital content components of its type. At 712, if the processor determines characterization in a desired segregation priority category is missing, it may execute a process 714 for recognizing priority of the missing segregation class or criteria. If at 712 the processor determines that no desired segregation priority criteria is missing, it may proceed to determine at 722 whether prioritization of the digital content is finished. From block 722, if the process 700 is not complete the processor may proceed to select the next digital content component in the content at block 702.

The process 714 may receive at least a portion (e.g., a frame of video data) of the digital content component and/or its metadata as input and output a priority in a specified segregation class. The priority may be expressed as metadata in the data structure 250, for example, as one of the parametric (e.g., semantic) tags 256. The process 714 may be, or may include, one or more of: a deterministic rules-based algorithm that processes the input using a predetermined ruleset; a machine-learning algorithm trained to recognize a characteristic (e.g., a character, place or object identity) over a set of training data; or a combination of deterministic and machine-learning algorithms. At 716, the processor may record the determined priority in the data structure 250. At 718, the processor may determine whether determining priority for the digital content component is finished; if not, if may increment the class by one at 720 and revert to process 714 for the next class. If determination is finished, the processor may determine at 722 whether prioritization of the digital content is finished. If the determination of the content is complete the processor may terminate the process 700 at 724.

Figure 8:
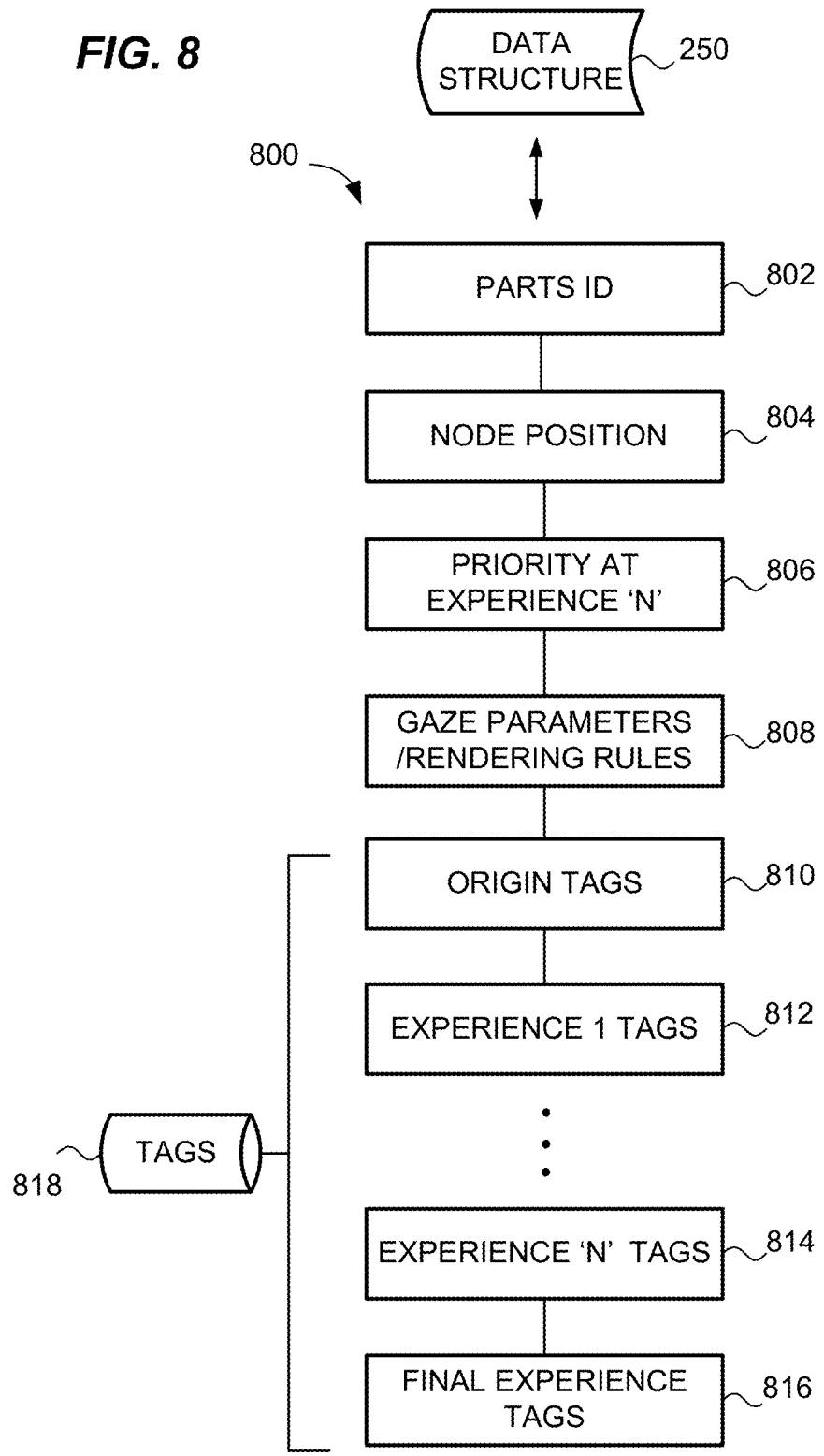
FIG. 8 is a diagram illustrating aspects of a data structure for use by one or more processors for relating an audience experience with a scheme.

FIG. 8 shows an example of a data structure 800 for use by one or more processors for generating a scheme for allocating the digital content based on audience experience, for example a node position (e.g., assigned node in the narrative tree); priority of the digital content component upon the audience experience; gaze parameters or rendering rules, such as action, dialog, character or object appearing in or referenced by the digital content component, or a duration of play of the digital component with a travel event, for example a change in estimated time remaining until arriving at, or user selection of, a destination, an origin, or a location along the route. Elements of the data structure 800 shown in FIG. 8 may be linked to any digital content component identifier by a data structure 250 as shown in FIG. 2, or equivalent data structure having elements corresponding to one or more of the elements 802-816. The elements 806-816 are generic with respect to any particular experience or audience member, and so may be used to correlate a digital content component to multiple content consumptions by multiple audience members. For example, a processor may correlate a digital content component with a duration of 3 seconds (i.e., a particular duration) and a parametric tag of "side screen A" (i.e., a particular semantic tag) in the data structure 250 to a gaze by any audience member, during an audience experience where one or more audience members gaze at the side screen A (e.g., FIG. 1: 120*b*) with a duration of 3 seconds or longer. The data structure 800 may be of any suitable type, for example as described in connection with data structure 250 herein above.

The data structure 800 may include elements pertaining to an audience experience. In some embodiments, the data structure 800 may include elements pertaining to trip and passenger in a vehicle. A processor of a client device or server may set certain elements, for example, the parts ID 802, an origin name included in the origin tags 810 and a final destination name included in the final experience tags 816, based on a trip request by the passenger (e.g., from a ride hailing application). Other elements may be populated automatically by a server. For example, the server, which may be a remote trip configuration and tracking server, may assign a unique parts ID 802 for the dataset 800, select one or more audience experience names and locations if any, as experience 'N' tags 812-814, based on route information from the trip provided by a navigation server.

For example, referring back to FIG. 4C, suppose an audience member is a passenger in a vehicle equipped with a surround screen (e.g., vehicle 160) and is traveling from Century City to San Diego. The passenger's name in an example is Mark (not shown). Mark hails vehicle 160 for his trip from Century City to San Diego, which is a rideshare. Upon boarding the vehicle, Mark is greeted by an avatar of the vehicle named Alfred with an audio-visual message on main screen 414 (or 454, 464, etc.) and via an audio output of the surround screen system (not shown; may or may not be connected to the vehicle audio system), "Welcome, Mark. Please buckle up." Mark has some time to kill and initially requests "Show Batman: Arkham on the screen using a comic book reader." Based on his request, the processor may pick a non-zero integral number 'N' of experience tags and add their names and locations along the route of the trip to the data structure 800 at elements 812-814. For example, the processors may access a remote trip configuration and tracking server (e.g., a proprietary in-car navigation system or a GPS navigation service) to obtain a trip information including the estimated time of arrival, intermediate destinations, and live traffic conditions for the ride from Century City to San Diego, and determines that the estimated travel time is 2 hours and 30 minutes taking Interstate 405 and Interstate 5. In an alternative, or in addition, the server may calculate a most favorable route using a machine-learning algorithm trained over a set of travel and interest data. In some embodiments, the trip information, such as the calculated route, GPS location of the vehicle on a map, travel time, traffic alert, etc., may be displayed on sub-screen 430. Once picking the most favorable route, server may populate the relevant elements 812-814. To pick the intermediate experience tags, the server may select from a list of audience experiences by filtering against expressed or implied priorities or preferences of the passenger, subject to the constraints that an allotted time for the digital content should not be more than the (estimated or actual) travel time or less than a percentage (e.g., 90%) of the estimated travel time. For example, if Mark has an expressed or implied interest in "flight or driving simulation," the server may weight a list of digital content components (e.g., scenes or episodes of the comic book) where Batman is flying or driving the Batmobile, and then load a game content to allow Mark to experience simulated flight or drive of the Batmobile while the digital content is being displayed on the surround screen.

For example, referring back to FIG. 4D, the processors display a flight simulation of Batmobile on main screen 414, while displaying a scene of Batman inside the cockpit of Batmobile on side screen 460 (462), and displaying a villain whom Batman is chasing on side screen 458 (456). In some embodiments, the processors may give weight to the flight simulation content with higher priority depending on the trip information. For example, the processors may select flight simulation content for display on the surround screen while the vehicle is traveling (or is expected to do so, based on the live traffic and GPS information) at a highway cruising speed on an uncongested Interstate 5 (e.g., geographic location: between Huntington Beach and Carlsbad, presumed to be with little or no traffic), so that Mark may experience high velocity change of scenery more akin than not to actual flight, rather than when the vehicle may be traveling (or expected to travel) in a heavily congested, slow-moving city traffic. Similarly, other digital content components may be weighted with higher priority based on one or more other trip information, passenger's implied or expressed priorities or preferences, biometric data from one or more audience members (i.e., passengers) indicating a neurological response, or a profile of video content. For instance, assuming Mark also has an expressed or implied interest in rough-terrain/winding road driving simulation, and a video content of Batmobile ATV also has a profile with high weighted priority assigned to it, the processors may preferentially select a route that includes rough terrain or a winding road, to provide driving simulation experience thereon, in, e.g., Batmobile ATV.

In addition to name and geographic location of any audience experience elements 810-816, the server may add other parametric tags relating to the audience experiences, for example from a database of tags or other source. Continuing the example of Mark above with reference to FIG. 4D in which Mark is experiencing flight simulation in Batmobile, the tags may include the names of the characters appearing in the scene(s) of the comic book, Batman: Arkham, and descriptions of how the scenery relates to each name, for example, "Two-Face," "Penguin," "Arkham City," and so forth. In a similar manner, the server may assign any tag relevant to both the objects or elements appearing in or represented non-visually but audibly (e.g., character conversing in an off-screen dialog) in digital content components and to the passenger preference or affinity data.

The gaze parameters/rendering rules element 808 defines one or more parameters or rules relevant to each audience experience element 810-816. The gaze parameters or rendering rules may be assigned based on any action by one or audience members that can be determined by the server or a client device to occur at a particular time during consumption of the digital content. The priority at experience 'N' element 806 is of special interest to production of digital content, which is a forward-looking operation unconcerned with the past. To produce and configure the digital content in real time for an engaging audience experience beyond mere immersive viewing experience on a surround screen, the server needs to know position of the audience's view (e.g., where is the audience looking at on the surround screen), form factor of the surround screen, geometric details of the surround screen, as well as trip information in case the surround screen system is deployed in a travelling vehicle (e.g., how much time will pass until the vehicle reaches its final destination or passes an intermediate destination for which the server will select one or more digital content components). Gaze parameters and rendering rule may include, for example, "gaze position," "gaze duration," "screen aspect ratio," "screen dimension," "screen geometry," "screen resolution," "arrive at next," and "wait at," each of which can then be calculated at any point during enjoyment of the digital content. Parameters related to fixed screens (i.e., retractable projector screen such as 414 in FIG. 4C is not a fixed screen in this context) such as "screen aspect ratio," "screen dimension," "screen geometry," etc., may not change during a given session of consuming the digital content by one or more audience members, while other parameters such as "gaze duration" parameters or even "screen resolution," and in some instances screen geometry," etc., may be changed (by software and/or hardware control) and can have a set parametric value that may or may not change during a given session. Parameters that may change may be updated in the data structure 800 as digital content consumption progresses.

Referring to FIG. 4E, continuing the example of Mark traveling from Century City to San Diego, an example is illustrated where movie content is displayed on the surround screen for Mark's enjoyment. In this example, shortly after Mark has boarded the vehicle and started on his way, the processors has determined that there is heavy traffic on Interstate 405 between Century City and Huntington Beach, and even though Mark has an expressed or implied interest in "flight or driving simulation," the server may weight a list of digital content components other than flight or driving simulation and instead opted for the next highest priority content based on Mark's expressed or implied interest, e.g., "Batman: Arkham Knight (The Movie)." The movie is in HD format, so while the main screen 414 (or 454, 464) accepts full HD display, the side screens 460 (462), 458 (456) or other screens of the surround screen (not shown) would not be filled with the movie content. In another example, the server may select "Batman Begins (Widescreen edition)," where the digital content (movie) may be repurposed for the surround screen. In some implementations, the processors may repurpose legacy-type digital contents or generate supplemental viewpoints to fill the side screens as follows:

"Wrap"—Spreading content so main screen spills over onto side screens

"Pan and scan"—Move main content around the screens depending on action/dialog;

"Blended virtual reality"—Model an environment and create a blended virtual reality; filmed content on main screen with rendered environment on side/rear screens.

Other techniques known in the art for repurposing legacy media contents for display on newer display or screen technologies may be employed.

Other techniques for providing greater diversity of engaging audience experiences may be employed, for example, as follows. Techniques may include alternative renderings or color schemes; same action. For example, referring back to FIG. 4C, the vehicle interior lighting is changed to amber color for producing a welcoming color scheme inside the vehicle for the new passenger (e.g., Mark). In contrast, referring back to FIG. 4D, while Mark is consuming the Batman: Arkham comic book content, the vehicle interior lighting is changed to green to match with the color scheme of the digital content being consumed. One or more processors may set lighting colors or patterns for mood and dramatic flair.

Techniques may include time-based (sliding window). For example, for panelized content, panels ride on a "ribbon" that slides across the surround screen with the "current" panel on the front screen. For video content, side screens (or screens other than the main screen) may show "past" clips that accentuate the main action on the main screen (e.g., based on an assigned priority). For example, referring back to FIG. 4D, the main screen 414 (454, 464) shows the current panel of the comic (or clip of a video), while the side screens 460 (462) and 458 (458), respectively, may show non-current panels (or clips).

In some embodiments, each passenger's audio feed may vary depending on which screen she is looking at.

For example, continuing with the scenario of FIG. 4E where "Batman: Arkham Knight (The Movie)" is shown on the main screen, the processors are displaying the main movie content on the main screen, while patterns of Batman logo, which form different parts of the digital content (e.g., the movie) are generated as contemporaneous video signal outputs (e.g., one for each of the screens or output devices), and outputted in synchrony to side screen 460 (462) and side screen 458 (456). The Batman logo patterns are intended to incite mood and dramatic flair for the audience (e.g., Mark, a fan of Batman) consuming the digital content.

The server may change add or remove audience experiences and add or remove parametric tags associated with each experience, as the trip/digital content consumption session progresses based on passenger/audience input, biometric data, traffic data and any other new available information. Thus, the data structure 800 can be updated and support dynamic configuring, assembling and producing of the digital content during travel/content consumption session.

Figure 9:
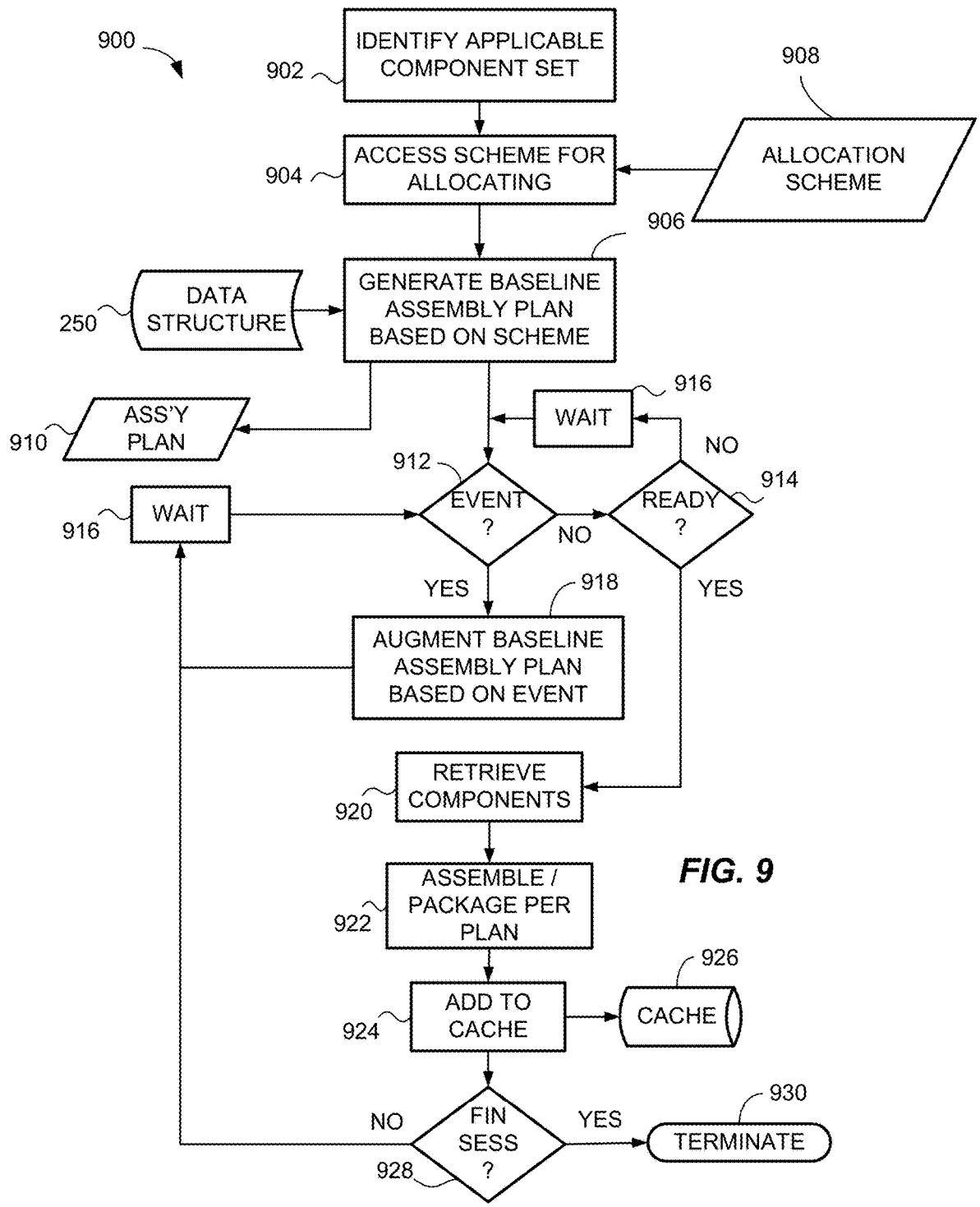
FIG. 9 is a flow chart illustrating aspects of assembling by one or more processors digital content from a set of components based allocation scheme.

Based on the information as described in connection with data structures 250 and 800, a server may assemble digital content package for surround screen system. For example, FIG. 9 shows a method 900 for assembling by one or more processors digital content package from a set of digital content components based on an allocation scheme. At 902, the processor may identify an applicable digital content component set for a surround screen system. For example, based on one or more information indicating aspect ratio of the individual screens forming the surround screen (e.g., as may be electronically retrieved from interconnection between the server and the screens), the server may filter out identifiers for non-pertinent content components from its library of all available content components. At 904, the server may access an allocation scheme 908, for example by identifying a parts ID and node position for locating pertinent allocation scheme in a data structure 800. At 906, the server may generate a baseline (e.g., initial) assembly plan based on the scheme 908, which may be contained in the data structure 800. The server may generate the plan based on how the digital content is segregated when received, priority, gaze of an audience member, position of digital content component's assigned node in a narrative tree, biometric data from one or more audience members indicating a neurological response; trip information relating to motion of the surround screen system, and a profile of video content on a highest-priority portion of the digital content, and other criteria as described elsewhere herein. The plan 910 may comprise a sequence of media segments with or without other media components, arranged in a list or other useful data structure.

At 912, the server may determine that an audience experience event defined in the data structure 800 has occurred, for example by tracking gaze of an audience member. If an event is detected, the server may update the assembly plan 910 based on the event. Although not shown in FIG. 9, the augmentation process 918 may use the most recent copies of the data structures 250, 800 available. For example, if a trip information is deleted or changed, the server may remove components picked for a deleted trip information, add components picked for the new trip information, and adjust components based on changes in the trip. At 916, the server may wait for the next event to occur. If at any time or times while waiting 916 the server determines, at 914 that it is ready to assemble and produce the digital content for presentation to the output devices or surround screen system (e.g., in vehicle 160 under travel, or in room 150), at 920, it may retrieve the digital content components for assembly. Then, at 922, the server may assemble the components into the digital content or portion of the digital content, for example by arranging digital content segments in a sequence and/or rendering a digital content component to produce a media segment.

At 924, the server may add the assembled components to a cache 926 for deliver to the surround screen. Content in the cache may be streamed or delivered in periodic packages to a media player associated with the surround screen, and thus, produced for consumption in real-time. Once delivered, the server may delete delivered content from the cache 926, immediately after delivery, immediately after the content consumption session is completed, or at some later time. At 928, the server may determine whether the production session is completed, for example in response to termination of the surround screen content or termination of the surround screen session by the passenger. Once finished, the server may terminate 930 the session.

Figure 10:
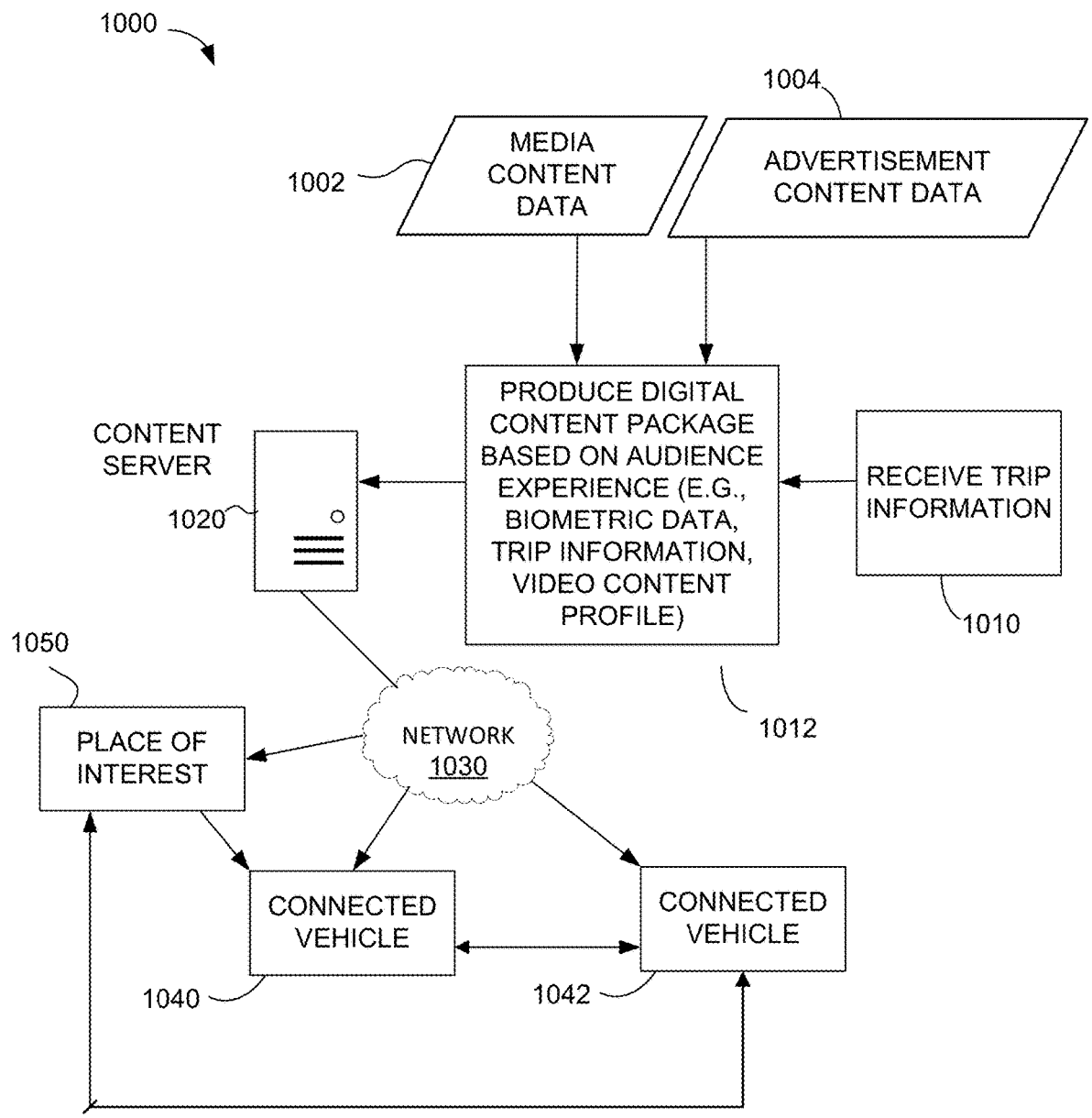
FIG. 10 is a block diagram illustrating an example of a computer network in which the novel methods and apparatus of the application may find use.

FIG. 10 summarizes a computer network 1000 in which the novel methods and apparatus of the application may find use. One or more content servers 1020 (e.g., a server farm or cloud) interconnected through a local area network, wide area network 1030, or other network may execute the processes and algorithms described herein, producing digital media content that may be stored and distributed. In some aspects, narrative content 1002 and advertisement content 1004 may be in analog (e.g., film) and converted to digital form using any suitable conversion process, for example, digital scanning. A production server may produce digital content with narrative content 1002 and ad content 1004 based on trip information 1010 (i.e., "trip" or movement information relating to motion of the surround screen system). One or more distribution servers may provide content for processing or delivery to servers at places (or points) of interest 1050 along the route and to connected vehicles 1040-1042, from the content server 1020 through the network 1030, e.g., the Internet or cellular telephone and data networks, and one or more router/modems/hotspots. The connected vehicles 1040-1042 and places of interest 1050 may be connected via a mobile mesh network. Each connected vehicle 1040-1042 may include one or more media players for playing the digital content. The media player may include, for example, smartphones, personal computers, notepad devices, projectors, and wearable xR devices.

The digital content may be transcoded to a suitable format for the player device prior to delivery.

Figure 11:
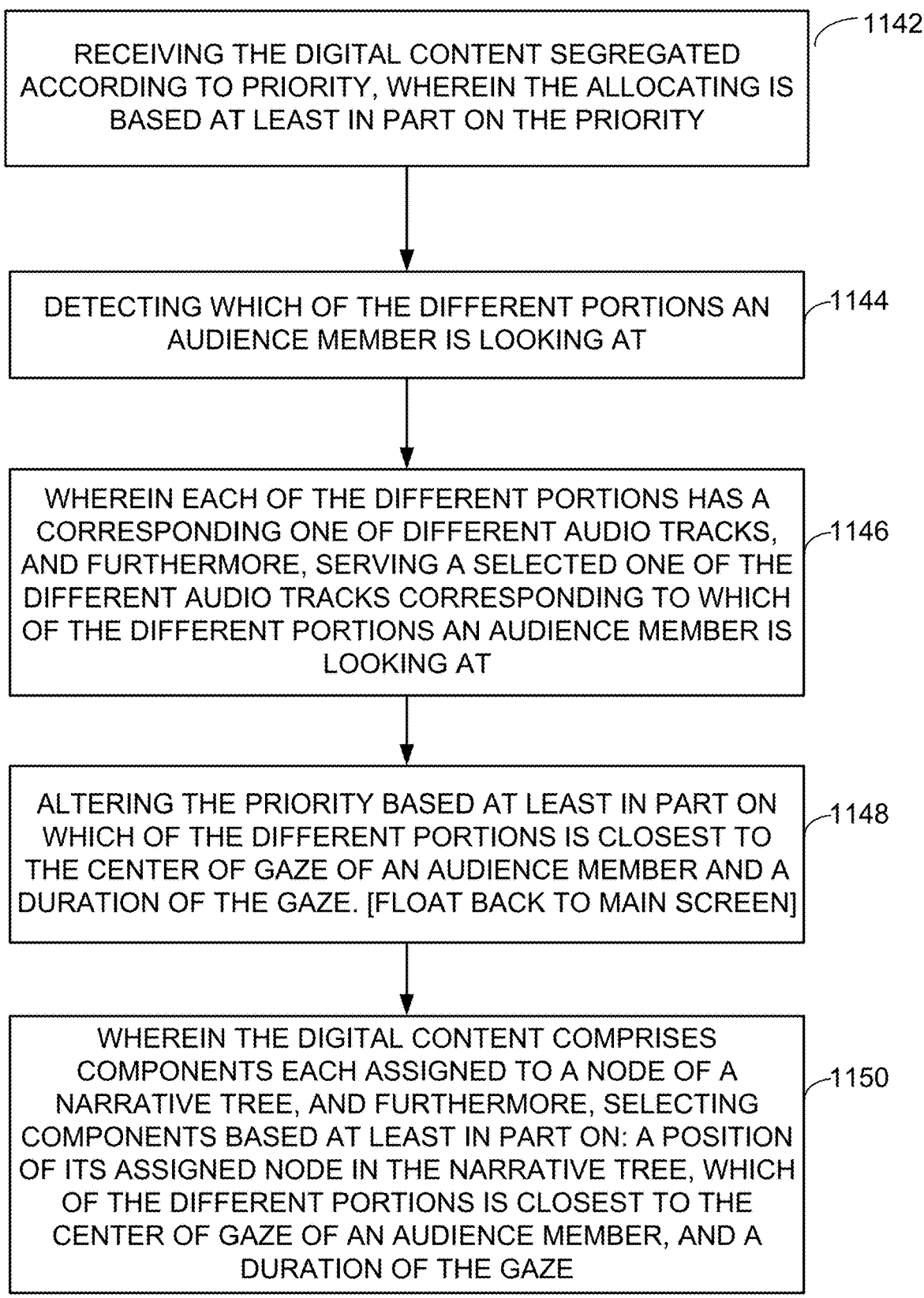
FIG. 11A is a flow chart illustrating a process for processing digital content by one or more processors of a media player for a surround screen output.
FIGS. 11B-11D are flow charts illustrating further optional aspects or operations of the method diagrammed in FIG. 11A.

FIG. 11A diagrams a useful automatic process 1100 for processing digital content by one or more processors of a media player for a surround screen output. In an aspect of the present disclosure, the process 1100 may be performed by one or more processors at a client node (e.g., room 150, vehicle 160, etc.), and/or content server(s) previously described. At 1102, a processor accesses an indication of a scheme for allocating the digital content between different portions of a surround screen system. The indication of a scheme for allocating may be a list such as the data structure 250 shown in FIG. 2B. An equivalent or different list may also be suitable. An initial list of digital content components may be assembled by a production team. At 1104, the processor allocates the digital content to the different portions of the surround screen system according to the scheme. The digital content may include analog or digital audio-video work, for example entertainment work, instructional, advertisement, gaming, social networking, and so on. The digital content may also include xR content. The audio-video work may be a defined narrative. The data structure may further include an ordered arrangement of digital content components for the defined narrative, for example audio video clips or an episode of a series and the like. In an aspect, the processor may determine associations of the digital content components with one or more parameters indicating allocation priority. For example, the processor may refer to a data structure 250 for example as shown in FIG. 2B and/or structure 800 as shown in FIG. 8 to retrieve a list of parameter tags and priority information.

At 1106, the processor provides different parts of the digital content to different output devices for output in synchrony to the surround screen system. In an aspect, the different parts of the digital content may refer to main content (e.g., main movie content, or the main act/dialog portion within a particular scene versus background scenery) and separate contemporaneous contents (e.g., bonus features associated with the main movie content, such as director's commentary, bloopers, behind-the-scenes, scenes viewed from different camera angles, etc., or the background scenery versus the main act/dialog portion within the particular scene). For example, referring back to FIG. 4E, the main content may be the movie content displayed on the main screen 414, while the Batman logos displayed on the side screens 460 or 458 may be separate contemporaneous contents (video signal outputs), which form the different parts of the digital content. In an aspect, the different output devices may include different screens making up the surround screen system, for example, with reference to the surround screen 452 in FIG. 4E, main screen 414, side screens 460, 462, 458, 456, and sub-screen 430.

FIGS. 11B-11D show additional operations 1120-1170 that may optionally be included in the method 1100 and performed by one or more processors performing the method 1100, in any operative order. Any one or more of the additional operations 1120-1170 may be omitted unless needed by a downstream operation and one or more of the operations 1120-1170 may replace one or more others of the operations of the method 1100. Any useful combination of operations selected from the group consisting of the operations 1102-1170 may be performed by one or more processors of an apparatus as described herein as an independent method distinct from other useful combinations selected from the same group.

Referring to FIG. 11B, the method may further include at 1122 wherein allocating further includes generating separate contemporaneous video signal outputs, one for each of the output devices. Examples of the separate contemporaneous video signal outputs and the output devices according to an aspect of the present disclosure have been discussed with respect to operation 1106 and elsewhere above.

At 1124, the method 1110 may further include wherein the allocating further includes generating a single video signal output with metadata enabling a downstream receiving device to send the different parts of the digital content to the different output devices. In an aspect, the different parts of the digital content include the main movie content and the Batman logo contents (see, e.g., FIG. 4D) forming a single video signal output with metadata. For example, the metadata may include "side screen A" and "side screen B" for the Batman logo contents, and "main screen" for the main movie content part. In an aspect, an example of the downstream receiving device may include content consumption device 300 or any component(s) thereof. At 1126, the method 1110 may further include wherein the downstream receiving device divides the video signal output into the different parts for each of the output devices.

At 1128, the method may further include receiving the digital content selected from the group consisting of: streaming digital content, a digital file, or a collection of digital files. For example, streaming digital content includes multimedia that is constantly received by and presented to an end-user while being delivered by a provider and may apply to media such as digital video and audio contents and also closed captioning, ticker tape, real-time text, or other output data.

At 1130, the method may further include receiving the digital content segregated for the different portions of the surround screen system, wherein the allocating is based at least in part on how the digital content is segregated when received. For example, referring back to FIG. 4E, the movie content may be segregated for on the main screen 414, while the Batman logos may be segregated for display on the side screens 460 or 458, and allocated accordingly to the different screens.

Referring to FIG. 11C, the method may further include at 1142 receiving the digital content segregated according to priority, wherein the allocating is based at least in part on the priority. For example, referring to FIG. 4E, the movie content may be tagged with a higher priority and segregated for display on the main screen 414, compared to the Batman logos which may be tagged with relatively lower priority and therefore segregated for display on the side screens 460 or 458, and allocated accordingly to the different screens. In some embodiments, the main screen may receive allocations of content with higher priority, but in some other embodiments, other screens besides the main screen may receive allocations of content with higher priority.

At 1144, the method may further include detecting which of the different portions of a surround screen system an audience member is looking at. For example, the method may detect which of the different portions an audience member is looking at by using input detected by sensors such as sensor 328 (see, e.g., FIGS. 3, 4A, 4B) or cameras (e.g., 130*a*, 130*b*, 130*c*: FIG. 1).

At 1146, the method may further include wherein each of the different portions has a corresponding one of different audio tracks, and furthermore, serving a selected one of the different audio tracks corresponding to which of the different portions an audience member is looking at. For example, referring to FIG. 4D, in an aspect, when an audience member is detected to be looking at side screen 460 (462), the processors may cause play-back of audio tracks containing a dialog "spoken" by Batman, and when an audience member is detected to be looking at side screen 458 (456), the processors may cause play-back of audio tracks containing a dialog "spoken" by the villain.

At 1148, the method may further include altering the priority based at least in part on which of the different portions is closest to the center of gaze of an audience member and a duration of the gaze. For example, referring to FIG. 4D, in an aspect, when an audience member is detected to be looking primarily at side screen 460 (462) for more than a predetermined minimum threshold duration (e.g., 1 second) but less than a predetermined maximum threshold duration (e.g., 3 consecutive seconds), and thereafter the gaze is determined to be located away from the side screen 460 (462), or the gaze lasts for less than the predetermined minimum threshold duration, the digital content "floats" to main screen (main screen 414). That is, in the example of FIG. 4D, in an aspect, while the audience is determined to be gazing at the side screen 460 (462) for more than 1 second, the dialog spoken by Batman is played-back, but once the audience is determined to be gazing away from the side screen 460 (462), or that the gaze does not last for 3 consecutive seconds, the play-back of the dialog of Batman is stopped or interrupted, and instead the audio floats back to the main screen 414, such that the audio of the content displayed on the main screen 414 (e.g., engine noise of flying Batmobile) is played back. In an aspect, when the gaze at the main screen 414 showing a flying Batmobile lasts for more than the predetermined maximum threshold duration, the scene of Batman in the cockpit "floats" to the main screen 414, and the digital content components associated to the scene of Batman in the cockpit now becomes the contents played on the main screen.

At 1150, the method may further include wherein the digital content includes components each assigned to a node of a narrative tree, and furthermore, selecting components based at least in part on: a position of its assigned node in the narrative tree, which of the different portions is closest to the center of gaze of an audience member, and a duration of the gaze. For example, referring to FIG. 4D, in an aspect, the scene of Batman appearing in the cockpit, the scene of Batmobile flying, and the scene of a close-up of the villain's face, are components assigned to three consecutive nodes of a narrative tree (e.g., three consecutive scenes from the comic book, Batman: Arkham). The operations of determining the different portions closest to the center of gaze of an audience member, and the duration of the gaze, may follow similar operations as those described with respect to the process 1148 above.

Referring to FIG. 11D, the method may further include at 1162 wherein the digital content comprises a sequence of panels, and the scheme calls for moving the panels in sequence along the different portions based on order along a line. For example, referring to FIG. 4D, the scenes of Batman in a cockpit, a flying Batmobile, and a close-up of a villain's face, are three panels in sequence (e.g., from newest to oldest in the series of three panels of a digital comic book), and the scheme calls for moving the panels in sequence from the side screen 458 (456), main screen 414 (454, 464), to side screen 460 (462), etc.

At 1164, the method may further include wherein the digital content may include widescreen images, and the scheme calls for spreading the widescreen images among adjacent panels of the surround screen system. For example, in an aspect, in case the digital content is "Batman Begins (Widescreen edition)," the widescreen images of the movie content may be displayed on the surround screen system to spread among adjacent screens of the surround screen system (e.g., screens 460, 414, and 458 in FIG. 4D; screens 120*a*, 120*b*, and 120*c* in FIG. 1).

At 1166, the method may further include generating at least a portion of digital content by rendering content using a model (2D or 3D) and rendering engine, such as a game engine.

At 1168, the method may further include determining rendering parameters based on one or more of: biometric data from one or more audience members indicating a neurological response; trip information relating to motion of the surround screen system, and a profile of video content on a highest-priority portion of the digital content. Further details of determining rendering parameters may be as described in International Application PCT/US2018/053625 by inventors hereof, which is incorporated herein in its entirely by reference. Biometric data may be combined with trip information and/or the profile of video content described elsewhere in the present disclosure.

At 1170, the method may further include generating the scheme for allocating the digital content based on a least one of a rules-based algorithm and a machine-learning algorithm, for example, using a predictive algorithm based on a deep neural network trained on digital content relative to priorities of digital content components and biometric data from one or more audience members indicating a neurological response as describe above.

Figure 12:
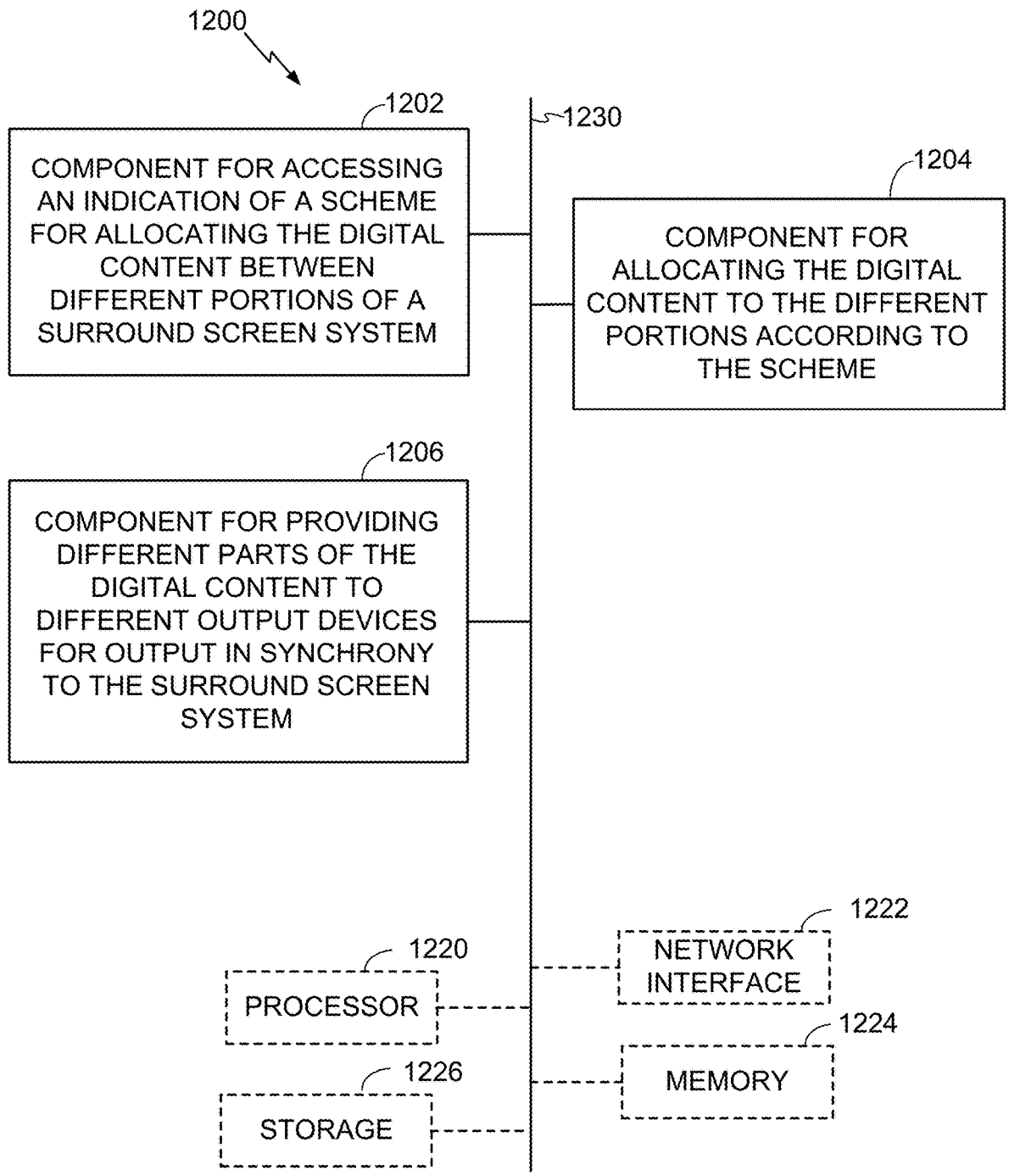
FIG. 12 is a conceptual block diagram illustrating components of an apparatus or system for the method as shown in FIG. 11A.

FIG. 12 is a conceptual block diagram illustrating components of an apparatus or system 1200 for processing digital content by one or more processors of a media player for a surround screen output. As depicted, the apparatus or system 1200 may include functional blocks that can represent functions implemented by a processor, software, or combination thereof (e.g., firmware).

As illustrated in FIG. 12, the apparatus or system 1200 may comprise an electrical component 1202 for accessing an indication of a scheme for allocating the digital content between different portions of a surround screen system. The component 1202 may be, or may include, a means for said accessing. Said means may include the processor 1220 coupled to the memory 1224, storage 1226 which may store the database, and to the network interface 1222, the processor executing an algorithm based on program instructions stored in the memory. Such algorithm may include a sequence of more detailed operations, for example, as described in connection with FIGS. 2B and 8 above; more particularly, the operations may include accessing a digital content component stored in a computer memory; accessing metadata for the digital content component, accessing a data structure as described in connection with FIG. 2B and optionally FIG. 8, and updating the data structure with new information derived from the media component and/or its metadata. Optionally, the operations may include deriving the new information by processing the digital content component using a rules-based and/or machine learning algorithm.

The apparatus or system 1200 may further comprise an electrical component 1204 for allocating the digital content to the different portions according to the scheme. The component 1204 may be, or may include, a means for said determining. Said means may include the processor 1220 coupled to the memory 1224, storage 1226, and to the network interface 1222, the processor executing an algorithm based on program instructions stored in the memory. Such algorithm may include a sequence of more detailed operations, for example, as described in connection with FIGS. 6A, 6B, 7 and 9 above.

The apparatus or system 1200 may further comprise an electrical component 1206 for providing different parts of the digital content to different output devices for output in synchrony to the surround screen system. The component 1206 may be, or may include, a means for said providing. Said means may include the processor 1220 coupled to the memory 1224, storage 1226, and to the network interface 1222, the processor executing an algorithm based on program instructions stored in the memory. In an aspect, the information may be received from external systems via the network interface 1222. Such algorithm may include a sequence of more detailed operations, for example, establishing a communication session with a client device associated with at least one of an audience member or a passenger; receiving during the session information from the client device identifying the details of the one or more screens that comprise the surround screen system, establishing communication sessions with each of the screens, establishing a communication session with a media player located in the one or more connected vehicles or rooms, at least one of streaming or pushing the digital content to the player device for surround screen output, and may include a sequence of more detailed operations, for example, as descried in connection with FIGS. 4A, 4B, 4C, 4D, and 4E above.

As shown, the apparatus or system 1200 may include a processor component 1220 having one or more processors, which may include a digital signal processor. The processor 1220, in such case, may be in operative communication with the modules 1202-1210 via a bus 1230 or other communication coupling, for example, a network. The processor 1220 may initiate and schedule the functions performed by electrical components 1202-1206.

In related aspects, the apparatus or system 1200 may include a network interface module 1222 operable for communicating with any external storage device, with external systems or servers, or connected vehicles over a computer network. In further related aspects, the apparatus or system 1200 may optionally include a module for storing information, such as, for example, a memory device/module 1224. The computer readable medium or the memory module 1224 may be operatively coupled to the other components of the apparatus 1200 via the bus 1230 or the like. The memory module 1224 may be adapted to store computer readable instructions and data for effecting the processes and behavior of the modules 1202-1206, and subcomponents thereof, or the processor 1220, or one or more steps of the method 700. The memory module 1224 may retain instructions for executing functions associated with the modules 1202-1206 and any one or more of the operations described herein, for example in connection with one or more of FIGS. 5, 6B, 7, 9, and 11A-11D. While shown as being external to the memory 1224, it is to be understood that the modules 1202-1206 can exist within the memory 1224.

Figure 13:
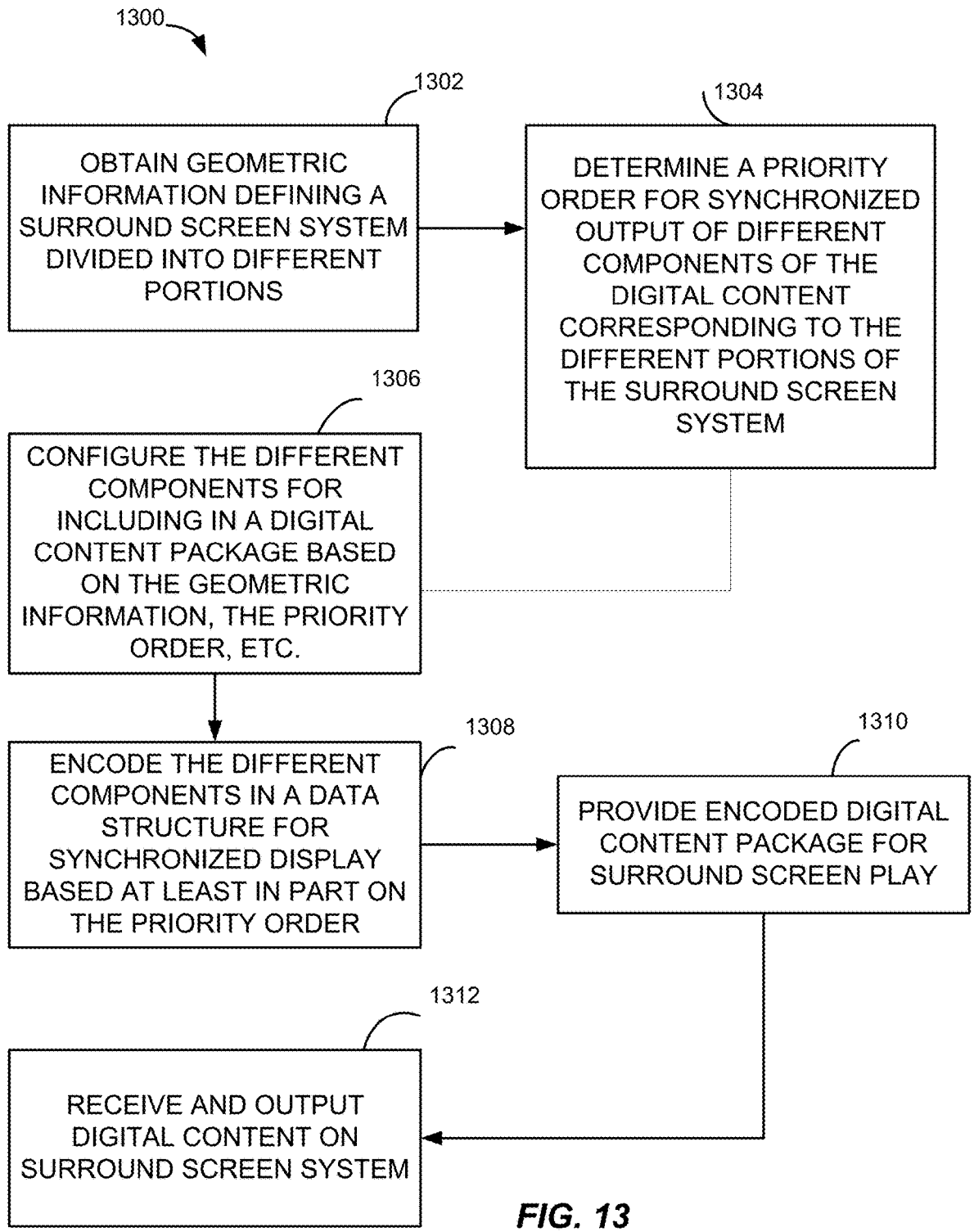
FIG. 13 is a schematic diagram illustrating an overview of a method for providing, by one or more processors, digital content for a surround screen system.

FIG. 13 is a schematic diagram illustrating an overview of a method for providing, by one or more processors, digital content for a surround screen system. The method 1300 may be performed by one or more computer processors of a server in electronic communication with a connected vehicle (e.g., vehicle 160) and/or a room (e.g., room 150) and media players. The servers may be found at points of interests along a travel route, and/or an independent server of a vehicle or room not in electronic communication with other vehicles or rooms, or may include other (e.g., mobile) servers. At the process 1302, the one or more processors obtain geometric information defining a surround screen system divided into different portions. In an aspect, geometric information may refer to form factor of screen, dimensions of screen, aspect ratio of screen, or other physical features of screen related to display of contents. For example, referring back to FIG. 1, a surround screen system in a room (e.g., room 150) may include a 100-inch main screen having a dimension of 1950×2250 mm of display area with 4K Ultra HD resolution (3840×2160 pixels), and two side screens, both 75-inch screens having a dimension of 935×1661 mm of display area, also with 4K Ultra HD resolution. In an aspect, the processors may obtain the geometric information defining the surround screen system from the individual displays, or the media player connected to the surround screen system identifying the geometric information of the screens. Other geometries of a surround screen system may also be used. For example, the method may be used with a surround screen system conforming to the ScreenX technology (CJ CGV, Seoul), having a recommended aspect ratio of 1:1.5 to 1:2.0 (front-side ratio), where front defines screen width of front screen in a room, and side refers to the length from the screen edge to the last row of seats in the room. In ScreenX, the viewing area is expanded onto side walls (or alternatively, projector screens to the side) of the room.

At the process 1304, the method may further include determining a priority order for synchronized output of different components of the digital content corresponding to the different portions of the surround screen system. In an aspect, the priority order may be represented in a data structure, for example data structure 250 shown in FIG. 2B. An equivalent or different list may also be suitable. In some embodiments, the processor may associate components of digital content with a logical address (e.g., position) of the component in a narrative tree. The narrative tree may be an organized and/or ordered listing of media segments, for example based on chronological order of the segments within the narrative, including one or more branches leading to alternative storylines. In an aspect, other metadata for the media segment may include, for example, an episode identifier of a program series, ratings, genre, and so on.

At the process 1306, the method may include configuring the different components for including in a digital content package based on the geometric information, the priority order, etc. In an aspect, the different components of the digital content may refer to main content which may be preferentially provided to the main screen, and separate contemporaneous contents that may be generated for each of the output devices and preferentially provided to other screens of the surround screen system. In some implementations, all of the different components of the digital content may be provided to any of the different portions of the surround screen system.

At the process 1308, the method may include encoding the different components in a data structure for synchronized display based at least in part on the priority order, resulting in an encoded digital package for surround screen display. The surround screen system may include various output device(s), such as the screens, speakers, 4D chairs, sub-screens, PPDs, etc. The method also includes selecting or configuring, and producing the digital content based in part on the specifications of the media player for each surround screen system, for example whether the media player has 3D or xR capabilities. The method may include recording the encoded digital package in a computer memory for later output.

At the process 1310, the method may include providing (e.g., streaming) encoded digital content package for to different output devices for output in synchrony to the surround screen system. At the process 1312, the method may include output devices(s) and media player device(s) at the surround screen system locations (e.g., connected vehicle 160, room 150, etc.) receiving and outputting the digital content at the start, during or at the destination of the trip, or a media player device at a room receiving and outputting digital content at a designated show time, etc.

In an aspect, one or more processors at the content server may perform one or more of the processes 1302-1312. In another aspect, one or more processors at the connected vehicle (e.g., vehicle 160) or the room (e.g., room 150) may perform one or more of the processes 1302-1312. Therefore, it should be noted that the following descriptions of these processes refer to either the content server or the client (e.g., vehicle, room, etc.), unless noted otherwise.

FIG. 14A diagrams a useful automatic process 1400 for providing, by one or more processors, digital content for a surround screen system. In an aspect of the present disclosure, the process 1100 may be performed by one or more processors at a client node (e.g., room 150, vehicle 160, etc.), and/or content server(s) previously described. At 1102, the processor accesses geometric information defining a surround screen system divided into different portions, similar in a manner as previously described with respect to FIG. 13. At 1404, the method includes determining, by the one or more processors, a priority order for synchronized output of different components of the digital content corresponding to the different portions of the surround screen system, similar in a manner as previously described with respect to FIG. 13.

At 1406, the method includes configuring, by the one or more processors; the different components for including in a digital content package based at least in part on the geometric information and the priority order. For example, referring to FIG. 4E, the movie content may be tagged with a higher priority and segregated for display on the main screen 414, compared to the Batman logos which may be tagged with relatively lower priority and therefore segregated for display on the side screens 460 or 458, and allocated accordingly to the different screens. In some embodiments, the main screen may receive allocations of content with higher priority, but in some other embodiments, other screens besides the main screen may receive allocations of content with higher priority. At 1408, the method includes encoding, by the one or more processors, the different components in a data structure for synchronized display based at least in part on the priority order, resulting in the encoded digital content package for surround screen display, similar in a manner as described with respect to FIG. 13.

FIGS. 14B-14C show additional operations 1430-1458 that may optionally be included in the method 1400 and performed by one or more processors performing the method 1400, in any operative order. Any one or more of the additional operations 1430-1458 may be omitted unless needed by a downstream operation and one or more of the operations 1430-1458 may replace one or more others of the operations of the method 1400. Any useful combination of operations selected from the group consisting of the operations 1402-1458 may be performed by one or more processors of an apparatus as described herein as an independent method distinct from other useful combinations selected from the same group.

Referring to FIG. 14B, the method may further include at 1432 wherein the different components comprise at least one of video clips or panelized static images arranged in a narrative order. An example of a video clip is shown in FIG. 4E, showing Batman logos on the side screens 460 (462) and 458 (456). An example of panelized static images arranged in a narrative order are shown in FIG. 4D, on side screens 460 (462) and 458 (456). At 1434, the method may further include wherein determining the priority order further comprises basing the priority order at least in part on an indicator of which of the different portions an audience member is looking at. For example, the method may obtain the indicator by detecting which of the different portions an audience member is looking at by using input detected by sensors such as sensor 328 (see, e.g., FIGS. 3, 4A, 4B) or cameras (e.g., 130a, 130b, 130c: FIG. 1).

At 1436, the method may further include including in the digital content different audio tracks corresponding to different portions. For example, referring to FIG. 4D, in an aspect, the digital content may contain audio tracks containing a dialog "spoken" by Batman, and also audio tracks containing a dialog "spoken" by the villain. In an aspect, when an audience member is detected to be looking at side screen 460 (462), the processors may cause play-back of audio tracks containing a dialog spoken by Batman, and when an audience member is detected to be looking at side screen 458 (456), the processors may cause play-back of audio tracks containing a dialog spoken by the villain.

At 1438, the method may further include including rules in the digital content for altering the priority based at least in part on which of the different portions is closest to the center of gaze of an audience member and a duration of the gaze. For example, the rules may be defined for a "float" process, similarly as described with respect to operation 1148 of FIG. 11C.

At 1440, the method may further include wherein the digital content includes components each assigned to a node of a narrative tree and the method further includes including rules in the digital content for selecting components based at least in part on: a position of its assigned node in the narrative tree, which of the different portions is closest to the center of gaze of an audience member, and a duration of the gaze, similarly as described with respect to operation 1150 of FIG. 11C.

Referring to FIG. 14C, the method may further include at 1452, wherein the digital content comprises a sequence of panels, and the method further comprises including rules in the digital content for moving the panels in sequence along the different portions based on order along a line, similarly as described with respect to operation 1162 of FIG. 11D.

At 1454, the method may further include wherein the digital content comprises widescreen images, and the method further comprises including rules in the digital content for spreading the widescreen images among adjacent panels of the surround screen system, similarly as described with respect to operation 1164 of FIG. 11D.

At 1456, the method may further include including rules in the digital content for generating at least a portion of digital content by rendering content using a model (2D or 3D] and rendering engine. For example, the rules may define operations of content generation similarly as described with respect to operation 1166 of FIG. 11D.

At 1458, the method may further include including rules in the digital content for determining rendering parameters based on one or more of: biometric data from one or more audience members indicating a neurological response; trip information relating to motion of the surround screen system, and a profile of video content on a highest-priority portion of the digital content. For example, the rules may define operations of determining rendering parameters in a manner similarly as described with respect to operation 1168 of FIG. 11D.

Figure 15:
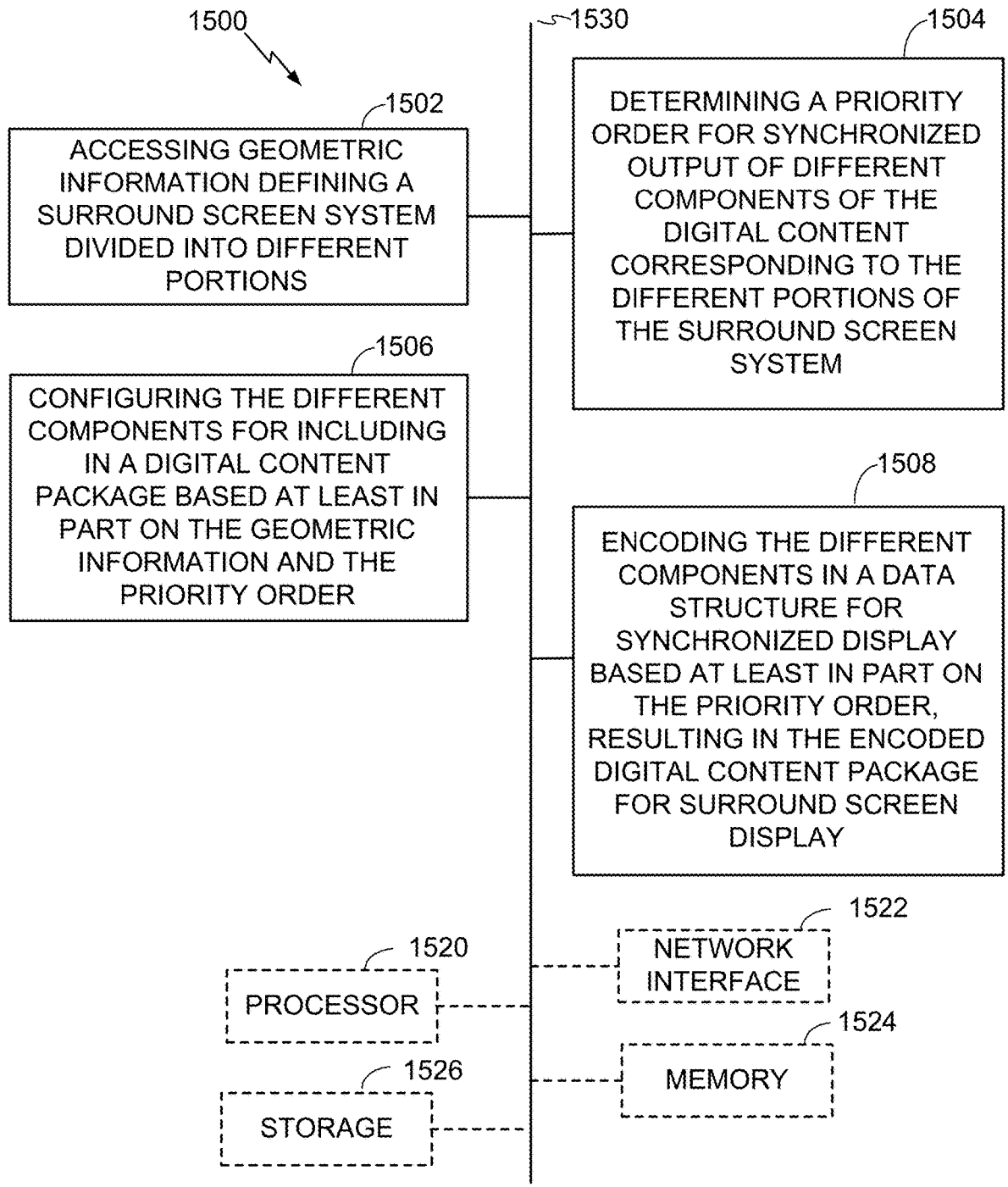
FIG. 15 is a conceptual block diagram illustrating components of an apparatus or system for the method as shown in FIG. 14A.

FIG. 15 is a conceptual block diagram illustrating components of an apparatus or system 1500 for providing digital content for a surround screen system. As depicted, the apparatus or system 1500 may include functional blocks that can represent functions implemented by a processor, software, or combination thereof (e.g., firmware).

As illustrated in FIG. 15, the apparatus or system 1500 may comprise an electrical component 1502 for accessing geometric information defining a surround screen system divided into different portions. The component 1502 may be, or may include, a means for said accessing. Said means may include the processor 1520 coupled to the memory 1524, storage 1526 which may store the database, and to the network interface 1522, the processor executing an algorithm based on program instructions stored in the memory. Such algorithm may include a sequence of more detailed operations, for example, as described in connection with FIG. 13.

The apparatus or system 1500 may further comprise an electrical component 1504 for determining a priority order for synchronized output of different components of the digital content corresponding to the different portions of the surround screen system. The component 1504 may be, or may include, a means for said determining. Said means may include the processor 1520 coupled to the memory 1524, storage 1526, and to the network interface 1522, the processor executing an algorithm based on program instructions stored in the memory. Such algorithm may include a sequence of more detailed operations, for example, as described in connection with FIGS. 6A, 6B, 7 and 9 above.

The apparatus or system 1500 may further comprise an electrical component 1206 for configuring the different components for including in a digital content package based at least in part on the geometric information and the priority order. The component 1506 may be, or may include, a means for said configuring. Said means may include the processor 1520 coupled to the memory 1524, storage 1526, and to the network interface 1522, the processor executing an algorithm based on program instructions stored in the memory. In an aspect, the information may be received from external systems via the network interface 1522. Such algorithm may include a sequence of more detailed operations, for example, as descried in connection with FIGS. 4A, 4B, 4C, 4D, and 4E above.

The apparatus or system 1500 may further comprise an electrical component 1206 for encoding the different components in a data structure for synchronized display based at least in part on the priority order, resulting in the encoded digital content package for surround screen display. The component 1506 may be, or may include, a means for said encoding. Said means may include the processor 1520 coupled to the memory 1524, storage 1526, and to the network interface 1522, the processor executing an algorithm based on program instructions stored in the memory. In an aspect, the information may be received from external systems via the network interface 1522. Such algorithm may include a sequence of more detailed operations, for example, as descried in connection with FIGS. 2B, 6A, 6B, and 7-9 above.

As shown, the apparatus or system 1500 may include a processor component 1520 having one or more processors, which may include a digital signal processor. The processor 1520, in such case, may be in operative communication with the modules 1502-1508 via a bus 1530 or other communication coupling, for example, a network. The processor 1520 may initiate and schedule the functions performed by electrical components 1502-1508.

In related aspects, the apparatus or system 1500 may include a network interface module 1522 operable for communicating with any external storage device, with external systems or servers, or connected vehicles over a computer network. In further related aspects, the apparatus or system 1500 may optionally include a module for storing information, such as, for example, a memory device/module 1524. The computer readable medium or the memory module 1524 may be operatively coupled to the other components of the apparatus 1500 via the bus 1530 or the like. The memory module 1524 may be adapted to store computer readable instructions and data for effecting the processes and behavior of the modules 1202-1508 and subcomponents thereof, or the processor 1520, or one or more steps of the method 1400. The memory module 1524 may retain instructions for executing functions associated with the modules 1502-1508 and any one or more of the operations described herein, for example in connection with one or more of FIGS. 13, 6B, 7, 9, and 14A-14C. While shown as being external to the memory 1524, it is to be understood that the modules 1502-1508 can exist within the memory 1524.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects are presented as systems or apparatus that may include several components, modules, and the like. It is to be understood and appreciated that the various systems or apparatus may include additional components, modules, etc. and/or may not include all the components, modules, etc. discussed in connection with the Figures. A combination of these approaches may also be used. The various illustrative logical blocks, modules, and circuits described in connection with the aspects disclosed herein may be executed by a general purpose processor, a digital signal processor (DSP), an application specific integrated circuit (ASIC), a field programmable gate array (FPGA) or other programmable logic device, discrete gate or transistor logic, with discrete hardware components in an apparatus or system designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-Ray™, or any other form of non-transitory storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, encoded instructions for a method may be embodied in an article of manufacture using standard programming and/or engineering techniques to produce computer-readable media holding software, firmware, hardware, or any combination thereof to control a computer to implement the disclosed aspects. Non-transitory computer readable media for such purpose can include but are not limited to magnetic storage devices (e.g., hard disk, floppy disk, magnetic strips, or other format), optical disks (e.g., compact disk (CD), DVD, Blu-Ray™ or other format), smart cards, and flash memory devices (e.g., card, stick, or other format). Those skilled in the art will recognize many modifications may be made to this configuration without departing from the scope of the disclosed aspects. Thus, the system methods described herein may be embodied in any computer-readable medium for use by or in connection with an instruction execution system, apparatus, or device, such as a computer-based system, processor-containing system, or other system that fetches the instruction execution system, apparatus or device, and execute the instructions. A computer-readable medium may be any device or apparatus that stores, communicates, propagates, or transports a program for use by or in connection with the instruction execution system, apparatus, or device. For example, non-transitory computer-readable medium may be an electronic, magnetic, optical, electromagnetic, infrared, or semiconductor system, apparatus, device, or other storage medium known in the art or yet to be developed.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. For example, process descriptions or blocks in flowcharts and block diagrams presented herein may be understood to represent modules, segments, or portions of code or logic, which include one or more executable instructions for implementing specific logical functions or steps in the associated process. Alternative implementations are included within the scope of the present disclosure in which functions may be executed out of order from the order shown or described herein, including substantially concurrently or in reverse order, depending on the functionality involved, as would be understood by those reasonable skilled in the art after having become familiar with the teachings of the present disclosure. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A method for processing digital content by one or more processors of a media player for a surround screen output, the method comprising:
  accessing, by the one or more processors, an indication of a scheme from a database, wherein the scheme defines an allocation for the digital content between different portions of a surround screen system, and wherein the scheme includes travel context data corresponding to a passenger trip in a vehicle;
  allocating, by the one or more processors, the digital content to the different portions of the surround screen system according to the scheme; and
  providing, by the one or more processors, different parts of the digital content to different output devices for output in synchrony to the surround screen system of the vehicle.

2. The method of claim 1, wherein the allocating further comprises generating separate contemporaneous video signal outputs, one for each of the output devices.

3. The method of claim 1, wherein the allocating further comprises generating a single video signal output with metadata enabling a downstream receiving device to end the different parts of the digital content to the different output devices.

4. The method of claim 3, wherein the downstream receiving device divides the video signal output into the different parts for each of the output devices.

5. The method of claim 1, further comprising receiving the digital content selected from the group consisting of: streaming digital content, a digital file, or a collection of digital files.

6. The method of claim 1, further comprising receiving the digital content segregated for the different portions of the surround screen system, wherein the allocating is based at least in part on how the digital content is segregated when received.

7. The method of claim 1, further comprising receiving the digital content segregated according to priority, wherein the allocating in based at least in part on the priority.

8. The method of claim 7, further comprising detecting which of the different portions an audience member is looking at.

9. The method of claim 8, wherein each of the different portions has a corresponding one of different audio tracks, and further comprising serving a selected one of the different audio tracks corresponding to which of the different portions an audience member is looking at.

10. The method of claim 8, further comprising altering the priority based at least in part on which of the different portions is closest to the center of gaze of an audience member and a duration of the gaze.

11. The method of claim 8, wherein the digital content comprises components each assigned to a node of a narrative tree and the method further comprises selecting components based at least in part on: a position of its assigned node in the narrative tree, which of the different portions is closest to the center of gaze of an audience member, and a duration of the gaze.

12. The method of claim 1, wherein the digital content comprises a sequence of panels, and the scheme calls for moving the panels in sequence along the different portions based on order along a line.

13. The method of claim 1, wherein the digital content comprises widescreen images, and the scheme calls for spreading the widescreen images among adjacent panels of the surround screen system.

14. The method of claim 1, further comprising by the one or more processors generating at least a portion of digital content by rendering content using a model and rendering engine.

15. The method of claim 1, further comprising by the one or more processors determining rendering parameters based on one or more of: biometric data from one or more audience members indicating a neurological response; trip information relating to motion of the surround screen system, and a profile of video content on a highest-priority portion of the digital content.

16. The method of claim 1, further comprising generating the scheme for allocating the digital content based on a least one of a rules-based algorithm and a machine-learning algorithm.

17. The method of claim 1, further comprising modifying the scheme based on an audience experience.

18. An apparatus for processing digital content for a surround screen output, the apparatus comprising at least one processor coupled to a memory, the memory holding program instructions that when executed by the at least one processor cause the apparatus to perform:
  accessing an indication of a scheme from a database, wherein the scheme defines an allocation for the digital content between different portions of a surround screen system, and wherein the scheme includes travel context data corresponding to a passenger trip in a vehicle; and
  allocating the digital content to the different portions according to the scheme; and providing different parts of the digital content to different output devices for output in synchrony to the surround screen system of the vehicle.

19. The apparatus of claim 18, wherein the memory holds further instructions for determining rendering parameters based on one or more of: biometric data from one or more audience members indicating a neurological response; trip information relating to motion of the surround screen system, and a profile of video content on a highest priority portion of the digital content.

20. The apparatus of claim 18, wherein the memory holds further instructions for generating the scheme for allocating the digital content based on a least one of a rules-based algorithm and a machine-learning algorithm.

* * * * *